US011023630B1

(12) United States Patent
Allan et al.

(10) Patent No.: US 11,023,630 B1
(45) Date of Patent: Jun. 1, 2021

(54) METHODS FOR MAKING GLASS ARTICLES

(71) Applicant: CORNING INCORPORATED, Corning, NY (US)

(72) Inventors: Douglas Clippinger Allan, Corning, NY (US); Adam James Ellison, Corning, NY (US); John Christopher Mauro, Boalsburg, PA (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 17/090,185

(22) Filed: Nov. 5, 2020

Related U.S. Application Data

(63) Continuation of application No. 16/245,951, filed on Jan. 11, 2019, now Pat. No. 10,846,446, which is a continuation of application No. 15/354,387, filed on Nov. 17, 2016, now Pat. No. 10,216,871, which is a continuation of application No. 13/662,652, filed on Oct. 29, 2012, now Pat. No. 9,533,907.

(60) Provisional application No. 61/553,459, filed on Oct. 31, 2011.

(51) Int. Cl.
| | |
|---|---|
| *C03B 5/00* | (2006.01) |
| *C03B 5/24* | (2006.01) |
| *G06F 30/20* | (2020.01) |
| *C03B 1/00* | (2006.01) |
| *G06F 17/11* | (2006.01) |
| *C03C 21/00* | (2006.01) |
| *C03B 32/00* | (2006.01) |
| *G06F 111/10* | (2020.01) |
| *C03B 18/02* | (2006.01) |
| *C03B 17/06* | (2006.01) |

(52) U.S. Cl.
CPC ............ *G06F 30/20* (2020.01); *C03B 1/00* (2013.01); *C03B 5/24* (2013.01); *G06F 17/11* (2013.01); *C03B 17/064* (2013.01); *C03B 18/02* (2013.01); *C03B 32/00* (2013.01); *C03C 21/001* (2013.01); *G06F 2111/10* (2020.01)

(58) Field of Classification Search
USPC ..................................................... 65/29.11
See application file for complete search history.

(56) References Cited

U.S. PATENT DOCUMENTS

| | | | | |
|---|---|---|---|---|
| 3,617,231 | A * | 11/1971 | Fenstermacher | C03C 1/00 65/30.12 |
| 5,102,439 | A * | 4/1992 | Jantzen | C03B 5/235 65/135.6 |
| 6,374,640 | B1 | 4/2002 | Fotheringham et al. | |
| 6,687,621 | B2 | 2/2004 | Schneiderman et al. | |
| 2006/0160691 | A1* | 7/2006 | Kawaguchi | C03B 5/193 501/66 |
| 2008/0066498 | A1 | 3/2008 | Markham et al. | |
| 2009/0220761 | A1* | 9/2009 | Dejneka | C03B 27/04 428/220 |
| 2011/0159219 | A1* | 6/2011 | Yue | C03C 23/007 428/34.4 |
| 2012/0083915 | A1 | 4/2012 | Allan et al. | |

OTHER PUBLICATIONS

Angell CA (1995) Formation of Glasses from Liquids and Biopolymers, Science 267:1924-1935.
Avramov, L, Milchev, A., "Effect of Disorder on Diffusion and Viscosity in Condensed Systems," 1988, J. Non-Crystalline Solids, 104:253-260.
Dyre et al, "Fundamental Questions Relating to Ion Conduction in Disordered Solids," Rep. Prog. Phys., 72, 046501 (2009).
Fuegel et al, "Electrical Resistivity of Silicate Glass Melts Calculation Based on the SciGlass Database," 2007 available online at http://glassproperties.com.
Hrma, Pavel, "Viscosity of Many-Component Glasses," Journal of Non-Crystalline, vol. 355, Issues 14-15, Jun. 1, 2009.
Hrma, Pavel, Arrhenius Model for High-Temperature Glass Viscosity Exponential Factor, Journal of Non-Crystalline, vol. 354, Issue 18, Apr. 15, 2008.
Hutton at al, Amorphous Materials, eds Douglas Rw, Ellis B (John Wiley & Sons, New York, 1972), p. 215.
Laughlin, "Viscous Flow in Simple Organic Liquids," The Journal of Physical Chemistry, vol. 76, No. 16, 1972.
Mazurin et al, "Electrical Conductivity of Glass Melts," Properties of Glass-Forming Melts, ed. by L.D. Pye, A Montenem, and I, Joseph, pp. 295-333 (CRC Press, Taylor & Francis Group, Boca Raton, FL 2005.
Naumis Gerardo, "Glass Transition Phenomenology and Flexibility Energy Landscape Formalism," Journal of Non-Crystalline vol. 352, issues 42-49, Nov. 15, 2006.
Phillips, J.C., "Constraint Theory, Vector Percolation, and Glass Formation", Solid State Communication, vol. 53, Issue 8, Feb. 1985.
Sturm VKG (1980) Zur Temperaturabhangigkeit der viskositat von flussigkeiten. Glastechn Ber 53:63-76.
Utracki LA 1974 "Temperature Dependence of Liquid Viscosity,"J. Macromol Sci B, 10:477-505.
Waterton, SC, The Viscosity-Temperature Relationship and Some Inferences on the Nature of Molten and of Plastic Glass, J. Soc. Glass Technol., 16:244-249.
Williams, Malcolm L., "The Temperature Dependence of Relaxation Mechanisms in Amorphous Polymers and Other Glass-Forming Liquids," Jul. 20, 1955.

(Continued)

*Primary Examiner* — Cynthia Szewczyk
(74) *Attorney, Agent, or Firm* — Russell S. Magaziner

(57) ABSTRACT

A method of making a glass article includes melting batch materials to produce molten glass, heating or cooling the molten glass to a temperature, forming a glass article from the molten glass. The batch materials include a plurality of viscosity-affecting components that become at least part of the glass article. Selection of the batch materials or the temperature was made at least in part using computer-implemented modeling where predicted equilibrium viscosity of the glass at the temperature is a function comprising concentrations of viscosity-affecting components and temperature-independent fitting coefficients for the viscosity-affecting components.

15 Claims, 15 Drawing Sheets

(56) References Cited

OTHER PUBLICATIONS

Wondraczek, Lothar, "Advancing Glasses Through Fundamental Research," Journal of the European Ceramic Society, vol. 29, Issue 7, Apr. 2009.
Adam et al.; "On the Temperature Dependence of Cooperative Relaxation Properties in Glass-Forming Liquids"; The Journal of Chemical Physics 43, (1965); pp. 139-146.
Anderson; "Through the Glass Lightly"; Science, vol. 267 (Mar. 17, 1995); pp. 1609-1618.
Angell et al.; "Relaxation in glassforming liquids and amorphous solids"; Journal of Applied Physics 88, (2000); pp. 3113-3157.
Angell; "Relaxation in liquids, polymers and plastic crystals—strong/fragile patterns and problems"; Journal of Non-Crystalline 131-133 (1991); pp. 13-31.
Azzou, Adila, et al. "Experiments and Model Simulations of the Viscosity and Dilatation of Glass Coatings with Temperature Dependence." Journal of the American Ceramic Society 92.3 (2009): 616-622.
Ellison et al.; "Glass Substrates for Liquid Crystal Displays"; International Journal of Applied Glass Science vol. 1, No. 1 (2010); pp. 87-103.
Fluegel, Alexander. "Glass viscosity calculation based on a global statistical modelling approach." Glass Technology—European Journal of Glass Science and Technology Part A 48.1 (2007): 13-30.
Fotheringham et al; "Special Topics in Relaxation in Glass and Polymers"; Lecture 5: Viscoelasticity I Shear; Schoti AG; Virtual Glass; 2020; 19 Pages, Available at https://www.lehigh.edu/imi/leched/Relax2010/RelaxationCourse.html.
Fulcher; "Analysis of Recent Measurements of the Viscosity of Glasses"; J. Am. Ceram. Soc. 8 (1925); pp. 339-355.
Gupta et al. "Composition dependence of glass transition temperature and fragility. I. A topological model incorporating temperature-dependent constraints," J. Chem. Phys., 2009, 130:094503.
Hagy; "Experimental Evaluation of Beam-Bending Method of Determining Glass Viscosities in the Range 108 to 1015 Poises"; J. Am. Ceram. Soc. 46 (1963); pp. 93-97.
Hara; "Viscous Flow and Relaxation Phenomena in Inorganic Glass"; Journal de Physique Colloques; 1982, 43 (C9) pp. C9-431-C9-434.
Hrma, P. "Glass viscosity as a function of temperature and composition: A model based on Adam-Gibbs equation." Journal of Non-Crystalline Solids 354.29 (2008): 3389-3399.
Macdonald et al.; "Topological Derivation of Shape Exponents for Stretched Exponential Relaxation" ; J. Chem. Phys. 122, 074510 (2005); pp. 1-21.
Mauro et al. "Composition dependence of glass transition temperature and fragility. II. A topological model of alkali borate liquids," J. Chem. Phys., 2009, 130:234503.
Mauro et al., "A Nonequilibrium statistical mechanical model of structural relaxation in glass," J. Am. Ceram. Soc., 2006, 89: 1091-1094.
Mauro et al., "Enthalpy landscapes and the glass transition," Sci. Model. Simul., 2008, 15:241-281.

Mauro et al., "Selenium glass transition: A model based on the enthalpy landscape approach and nonequilibrium statistical mechanics," Phys. Rev. B, 2007, 76:174202.
Mauro et al., "Viscosity of glass-forming liquids," PNAS, 2009, 106:19780-19784.
Mauro et al.; "Continuously broken ergodicity"; The Journal of Chemical Physics 126, 184511 (2007).
Mauro et al.; "Impact of fragility on enthalpy relaxation in glass"; Physical Review E 78, 021502 (2008).
Mauro et al.; "Metabasin Approach for Computing the Master Equation Dynamics of Systems with Broken Ergodicity"; J. Phys. Chem. A 2007, 111; pp. 7957-7965.
Mauro et al.; "Monte Carlo method for computing density of states and quench probability of potential energy and enthalpy landscapes"; The Journal of Chemical Physics 126, 194103 (2007).
Mauro et al.; "Nonmonotonic Evolution of Density Fluctuations during Glass Relaxation"; Physical Review Letters 102, 155506 (2009).
Mauro et al.; "Split-Step Eigenvector-Following Technique for Exploring Enthalpy Landscapes at Absolute Zero"; J. Am. Chem. B 2006, 110; pp. 5005-5011.
Mauro, et al., "Fictive Temperature and the Glassy State," J. Am. Ceram. Soc., 2009, 92:75-86.
Mauro, John C. et al. "Nonequilibrium Viscosity of Glass", Sep. 30, 2009, Physical Review B 80, 094204.
Naraki et al; "The New Index for High Surface Comperssive Stress on Short Quenching" ; Reports Res. Lab. Asahi Glass Co. Ltd., 55 (2005) pp. 33-38.
Phillips; "Stretched exponential relaxation in molecular and electronic glasses"; Rep. Prog. Phys. 59 (1996); pp. 1133-1207.
Phillips; "Topology of Covalent Non-Crystalline Solids I: Short-Range Order in Chalcogenide Alloys"; Journal of Non-Crystalline Solids 34 (1979); pp. 153-181.
Rekhson, S. M., and G. W. Scherer. "Glass Transition as a Function of Cooling Rate." Le Journal de Physique Colloques 43.C9 (1982): C9-427.
Ritland, H. N., "Limitations of the Fictive Temperature Concept" J. Am. Ceram. Soc., 1956, 39:403-406.
Scherer; "Editorial Comments on a Paper by Gordon S. Fulcher"; J. Am. Ceram. Soc., 75 [5] (1992); pp. 1060-1062.
Scherer; Relaxation in Glass and Composites; Chapter 10 "Phenomenological Model of Structural Relaxation"; Krieger Publishing Company, Malabar, Florida, 1992; pp. 130-145.
Tandon et al., "Method to Estimate Thermal Shrinkage Behavoir of Glasses," Intl. J. Applied Glass Sci., 2011, 2:192-200.
Varshneya; "Chemical Strengthening of Glass: Lessons Learned and Yet to Be Learned"; International Journal of Applied Glass Science 1 [2] (2010); pp. 131-142.
Varshneya; "The physics of chemical strengthening of glass: Room for a new view"; Journal of Non-Crystalline Solids 356 (2010); pp. 2289-2294.
Varshneya; Fundamentals of Inorganic Glasses Second Edition; Copyright Society of Glass Technology, 2006; pp. 216-240.
Zhang et al.; "Fragile-to-strong transition in metallic glass-forming liquids"; The Journal of Chemical Physics 133, 014508 (2010).

* cited by examiner

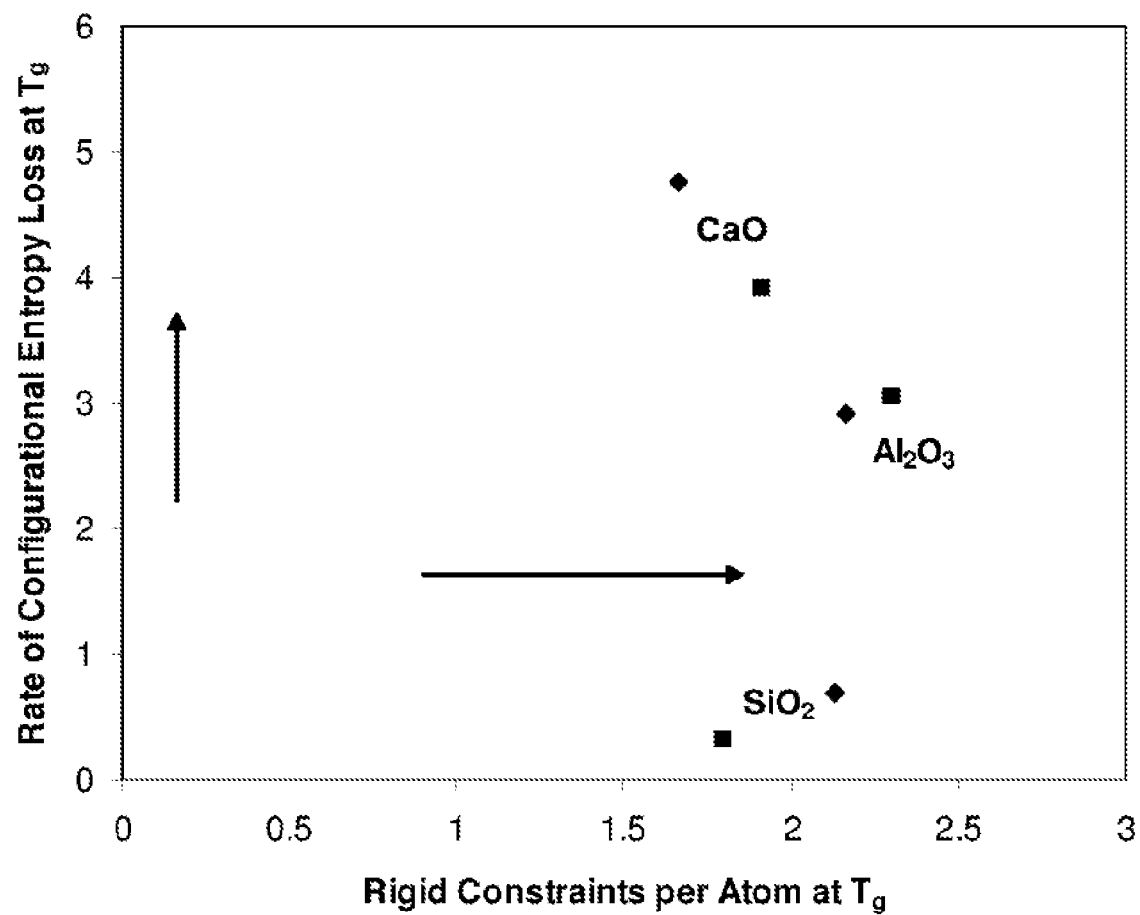
Fig. 4´

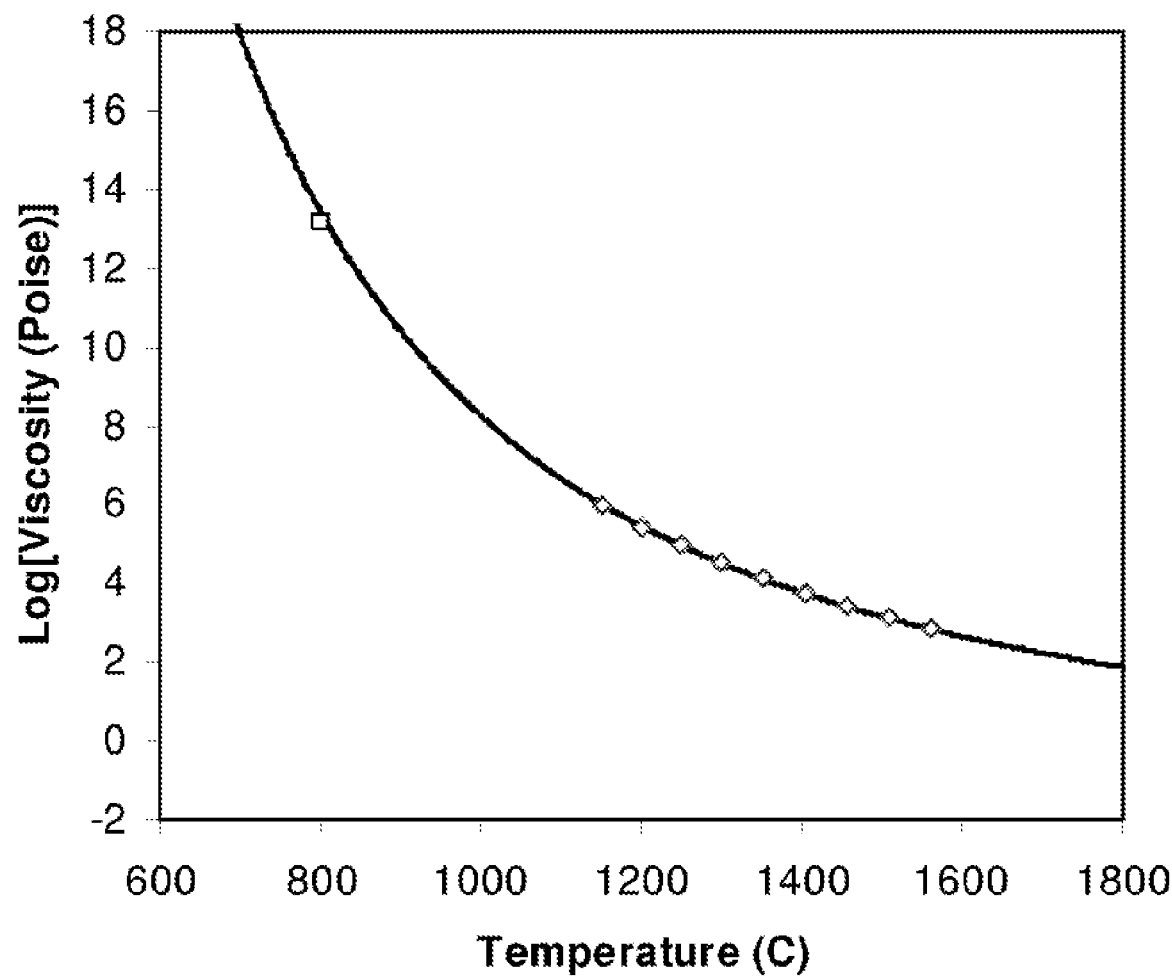
Fig. 5´

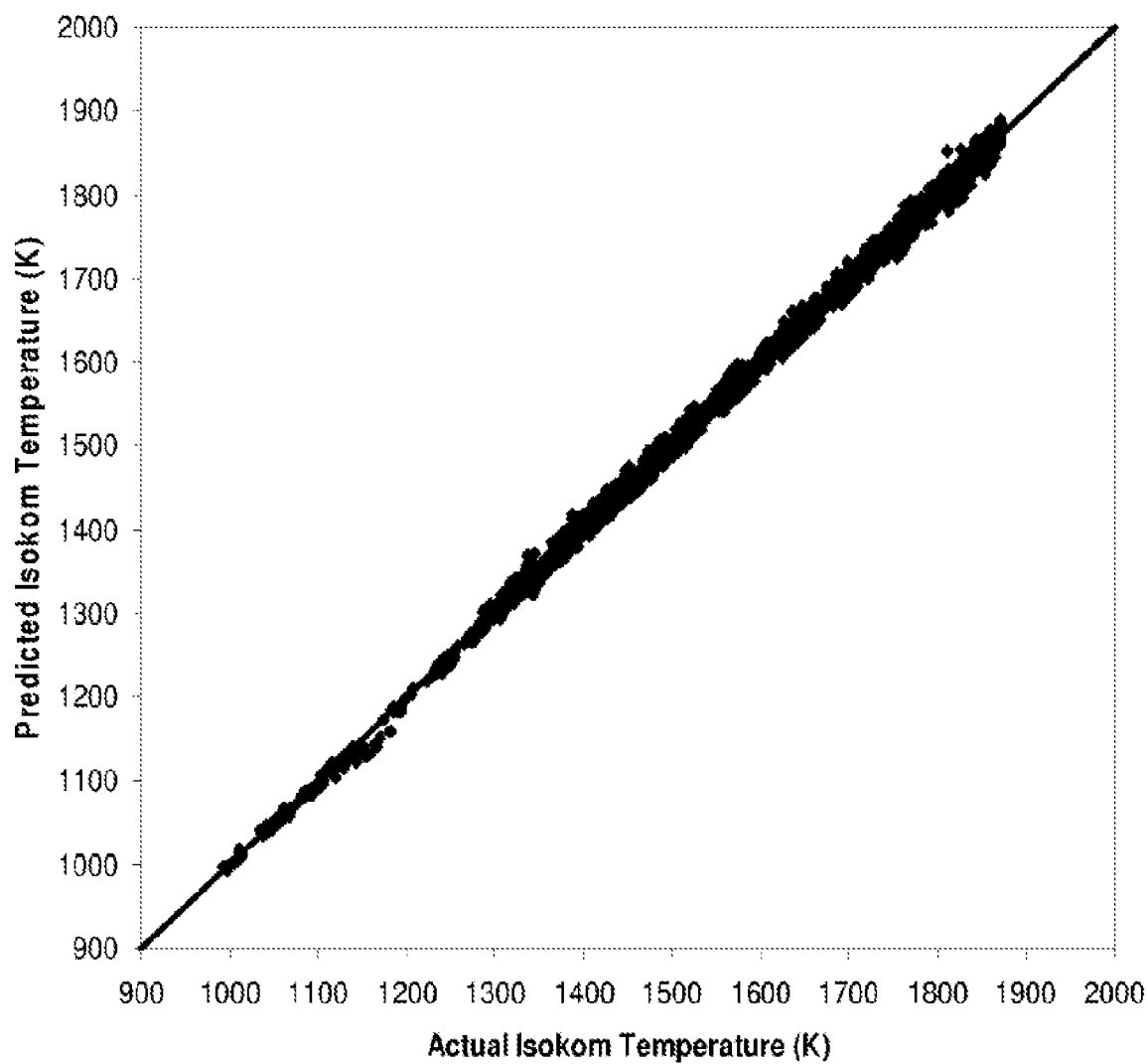
Fig. 6´

METHODS FOR MAKING GLASS ARTICLES

CROSS-REFERENCE TO RELATED APPLICATIONS

This Application is a continuation of U.S. application Ser. No. 16/245,951 filed Jan. 11, 2019, which is a continuation of U.S. application Ser. No. 15/354,387 filed Nov. 17, 2016, which issued on Feb. 26, 2019 as U.S. Pat. No. 10,216,871 and which is a continuation of U.S. application Ser. No. 13/662,652 filed Oct. 29, 2012, which issued on Jan. 3, 2017 as U.S. Pat. No. 9,533,907 and which claims the priority benefit of U.S. Application 61/553,459 filed Oct. 31, 2011, each of which is hereby incorporated by reference herein in its entirety. Further, as indicated in original paragraphs below, the entire content of commonly-assigned U.S. patent application Ser. No. 12/896,355, entitled "METHODS AND APPARATUS FOR PREDICTING GLASS PROPERTIES," filed on Oct. 1, 2010, has been incorporated in the present Application by reference, and much of which is transcribed in the present Application.

FIELD

This disclosure relates to methods and apparatus for predicting/estimating the non-equilibrium viscosity of glasses and/or glass-forming liquids (hereinafter referred to as "glass materials" or simply "materials").

DEFINITIONS AND CONVENTIONS

The terms "viscosity," "equilibrium viscosity," and "non-equilibrium viscosity" refer to shear viscosity, i.e., the response of the glass to an applied shear stress.

All viscosities referred to herein are assumed to have been divided by their units, e.g., Pa-s, to make numbers upon which the log function can operate.

As used herein, the glass transition temperature ($T_g(x)$) of a material is the temperature at which it has an equilibrium viscosity of $10^{12}$ Pa-s.

The term "glass article" is used in its broadest sense to include any object made wholly or partly of glass and/or a glass ceramic.

BACKGROUND

The problem of predicting the properties of glass materials has been a longstanding one in the field of glass and glass-ceramic chemistry. Because most glasses and glass-ceramics (referred to collectively herein as "glasses") contain a relatively large number of components, e.g., three to six or more in many cases, the compositional space is multi-dimensional, making experimental study of the entire space economically impractical. Yet, from melting through to forming, the production of glass articles would clearly benefit from an ability to predict/estimate glass properties based on glass composition or, conversely, to select glass compositions based on desired properties. Likewise, the ability to predict/estimate the behavior of glass articles during use, e.g., during post-forming thermal processing, would be of great value to the art.

Among all the technologically useful properties of a glass-forming system, the viscosity of the melt is undoubtedly among the most important. Every stage of industrial glass production—from the initial melting, mixing, and fining to the final forming operations—requires careful control of viscosity. For example, viscosity controls the rates of melting and of fining in a glass melting tank. Similarly, each glass forming operation, e.g., fiber forming or the final annealing of container glass, requires a certain well-defined viscosity range and consequently a specific temperature range for that operation. See, for example, Varshneya AK (2006) *Fundamentals of Inorganic Glasses*, 2nd ed. (Society of Glass Technology, Sheffield, UK).

Non-equilibrium viscosity is particularly important with regard to post-forming processing of glass articles. Specifically, non-equilibrium viscosity determines the relaxation rate of a final glass article (final glass product). As just one example, non-equilibrium viscosity controls the compaction behavior of display glasses (e.g., the glass sheets used as substrates in the production of liquid crystal displays) during customer heat treatment cycles. It should thus come as no surprise that the details of the viscosity-temperature-time relationship play a critical role in researching new glass compositions for display and other applications.

Among other reasons, the problem of relating equilibrium viscosity to temperature and composition is challenging because from the initial glass melting to final forming, viscosity varies by over twelve orders of magnitude. See, for example, Varshneya (2006), supra. Equilibrium viscosity is also sensitive to small changes in composition, especially in silicate melts where small levels of impurities can have a profound influence on the flow behavior. It is thus of great importance to have accurate knowledge of the scaling of viscosity with both composition (x) and temperature (T). Unfortunately, measurement of $\eta_{eq}(T,x)$ is challenging for high temperature melts, and low temperature measurements (i.e., in the high viscosity range, $10^{10}$ to $10^{15}$ Pa-s) are time consuming and often prohibitively expensive. See, for example, Varshneya (2006), supra. For non-equilibrium viscosities, the situation is even more complex because in addition to depending on composition (x) and current temperature (T), the non-equilibrium viscosity of a glass article also depends on the glass's thermal history, in particular, its thermal history from that point in time when it was last in thermal equilibrium with its surroundings.

SUMMARY

In accordance with a first aspect, a method is disclosed for making a glass article which includes:
(I) melting batch materials to produce molten glass (e.g., melting batch materials using commercial, laboratory, experimental, or other glass making equipment now known or subsequently developed); and
(II) forming a glass article from the molten glass (e.g., forming a glass article using commercial, laboratory, experimental, or other glass making equipment now known or subsequently developed);
wherein:
(A) the batch materials include a plurality of viscosity-affecting components which become at least part of the glass of the glass article (i.e., the viscosity-affecting components can make up the entire glass composition or only a part of the glass composition); and
(B) the method is characterized by the viscosity-affecting components and/or their concentrations being at least partially based on a computer-implemented model which relates to glass viscosity.

In accordance with a second aspect, a computer-implemented method is disclosed for predicting/estimating equilibrium viscosity.

Apparatus for practicing the above methods, specifically, programmed computers and non-transitory computer readable storage media, is also disclosed.

With regard to the viscosity-affecting components of a glass composition, it should be noted that those components can include clusters of constituents and/or constituents that might in some contexts be considered contaminants, e.g., water which would be considered a contaminant in, for example, glasses used in optical waveguide fibers. In many cases, the basic constituents of the glass will be oxides, it being understood that the technology disclosed herein can also be used with non-oxide glasses if desired. As to units, the composition can be expressed in any convenient units, mole percent and weight percent being the most common choices.

The above summaries of the various aspects of the disclosure are only for the convenience of the reader and are not intended to and should not be interpreted as limiting the scope of the invention. More generally, it is to be understood that both the foregoing general description and the following detailed description are merely exemplary of the invention and are intended to provide an overview or framework for understanding the nature and character of the invention.

Additional features and advantages of the invention are set forth in the detailed description which follows, and in part will be readily apparent to those skilled in the art from that description or recognized by practicing the invention as exemplified by the description herein. The accompanying drawings are included to provide a further understanding of the invention, and are incorporated in and constitute a part of this specification. It is to be understood that the various features of the invention disclosed in this specification and in the drawings can be used in any and all combinations.

As indicated in original paragraphs below, the entire content of commonly-assigned U.S. patent application Ser. No. 12/896,355, entitled "METHODS AND APPARATUS FOR PREDICTING GLASS PROPERTIES," filed on Oct. 1, 2010, has been incorporated in the present Application by reference, and from which figure descriptions are now transcribed. Prime marks (') denote reference numbers of U.S. application Ser. No. 12/896,355. No new matter is added.

Figure 1:
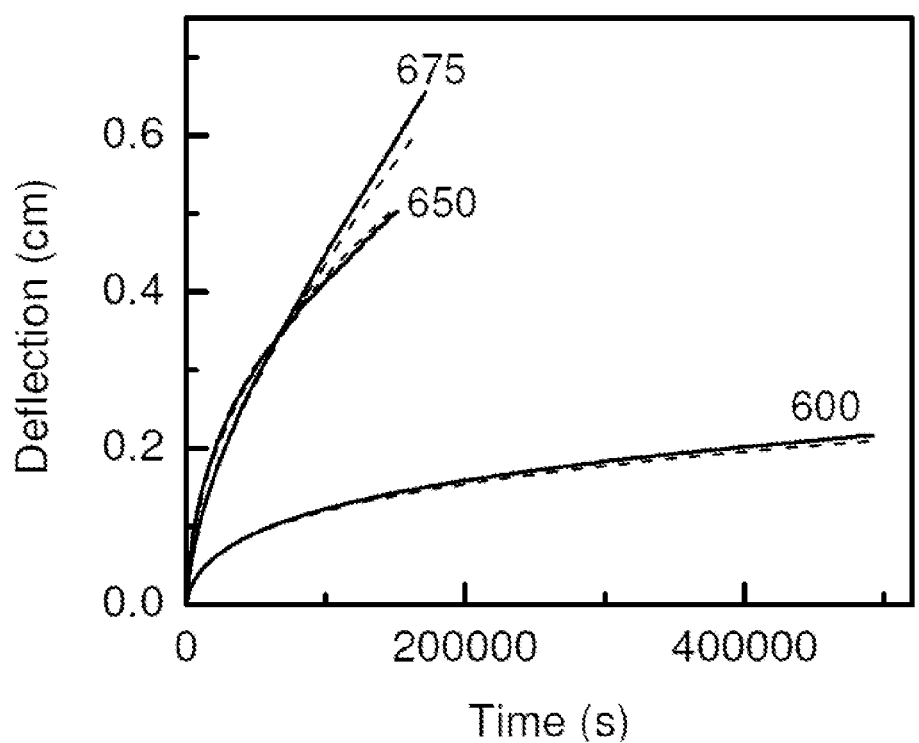
FIG. 1 is a plot comparing deflection versus time data from beam bending experiments (solid curves) with predicted results obtained using an embodiment of the non-equilibrium viscosity model disclosed herein (dashed curves). The glass used in the experiments and modeling was Glass A of Example 1.

FIG. 1' is a flowchart showing a representative sequence of steps that can be used with a programmed computer to determine fitting coefficients for embodiments of the present disclosure.

Figure 2:
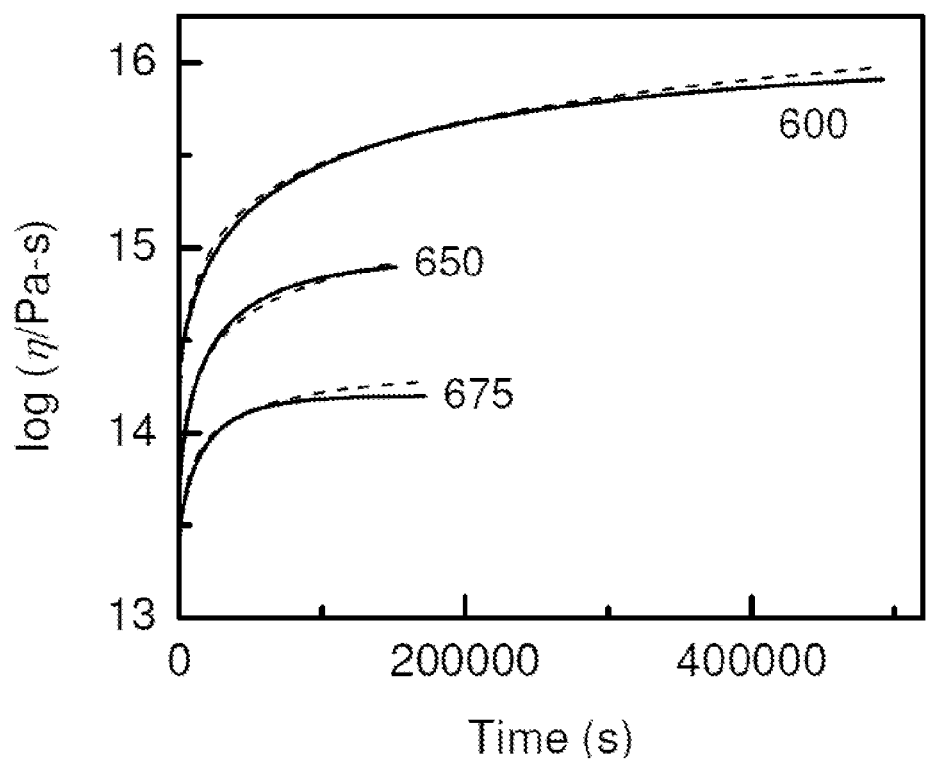
FIG. 2 is a plot of the viscosity behavior corresponding to the deflection behavior of FIG. 1.

FIG. 2' is a flowchart showing a representative sequence of steps that can be used with a programmed computer to control a glass manufacturing process based on predictions of glass properties in accordance with embodiments of the present disclosure.

Figure 3:
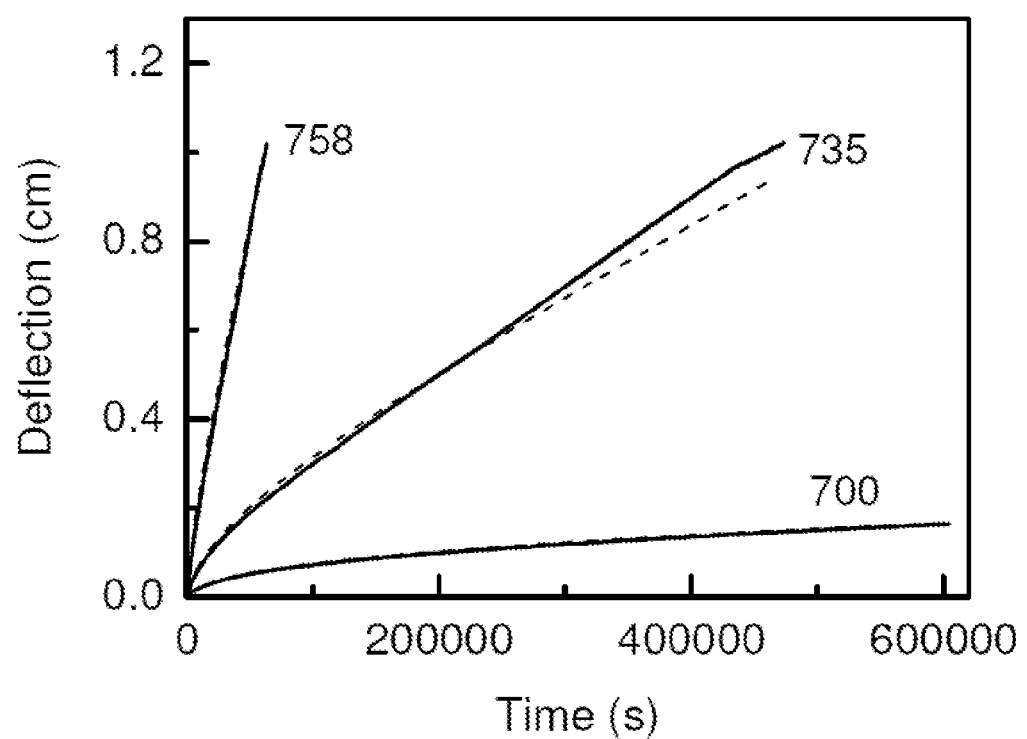
FIG. 3 is a plot comparing deflection versus time data from beam bending experiments (solid curves) with predicted results obtained using an embodiment of the non-equilibrium viscosity model disclosed herein (dashed curves). The glass used in the experiments and modeling was Glass B of Example 1.

FIG. 3' is a ternary diagram for annealing temperature calculated using an embodiment of the present disclosure.

Figure 4:
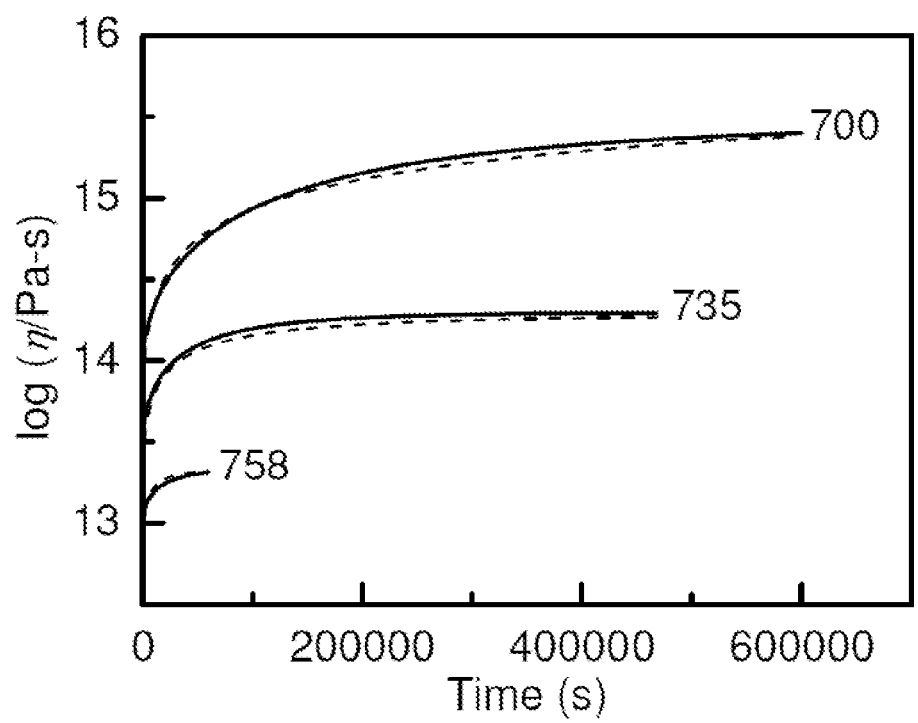
FIG. 4 is a plot of the viscosity behavior corresponding to the deflection behavior of FIG. 3.

FIG. 4' is a plot illustrating fitting coefficients of embodiments of the present disclosure. For these embodiments, each viscosity-affecting or resistivity-affecting component has two parameters: the number of rigid constraints per atom and the rate of configurational entropy loss at the glass transition. A higher number of rigid constraints leads to a higher glass transition temperature, and a greater entropy loss leads to a larger value of fragility.

Figure 5:
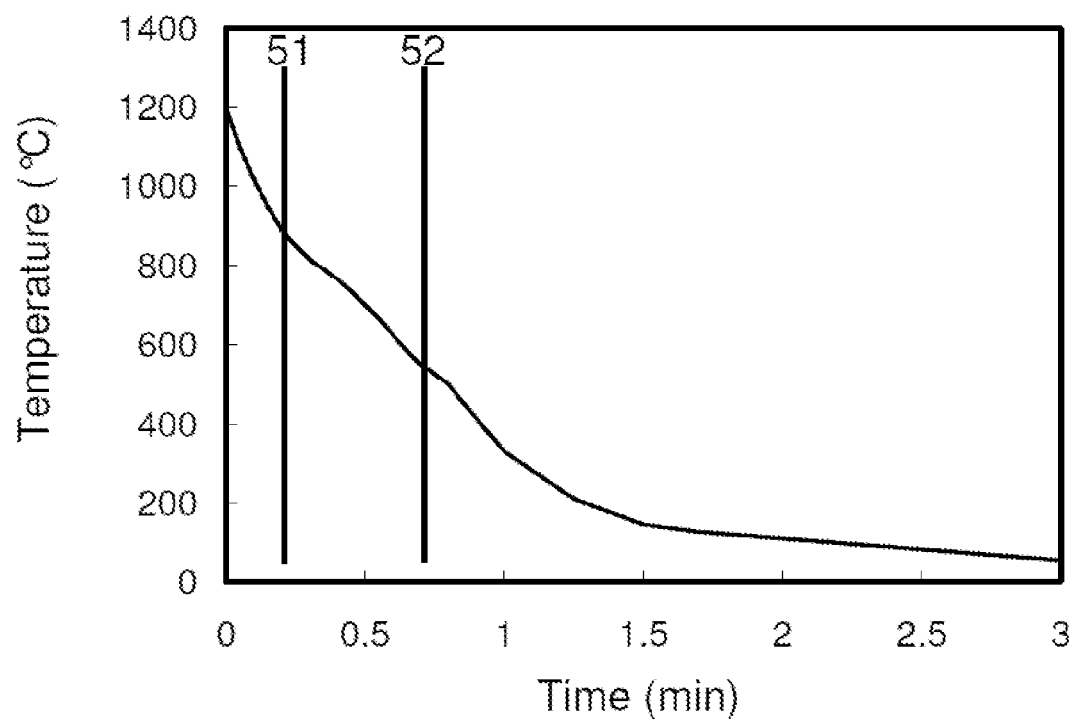
FIG. 5 is a non-limiting, representative plot of glass temperature versus time, i.e., a non-limiting, representative temperature profile, for a glass ribbon produced by a fusion process.

FIG. 5' shows a viscosity versus temperature curve obtained for a display-type glass using an equation for $\eta(T,x)$ of the type set forth in Eq. (1'). Experimental viscosity measurements performed on the glass are also plotted in this figure.

Figure 6:
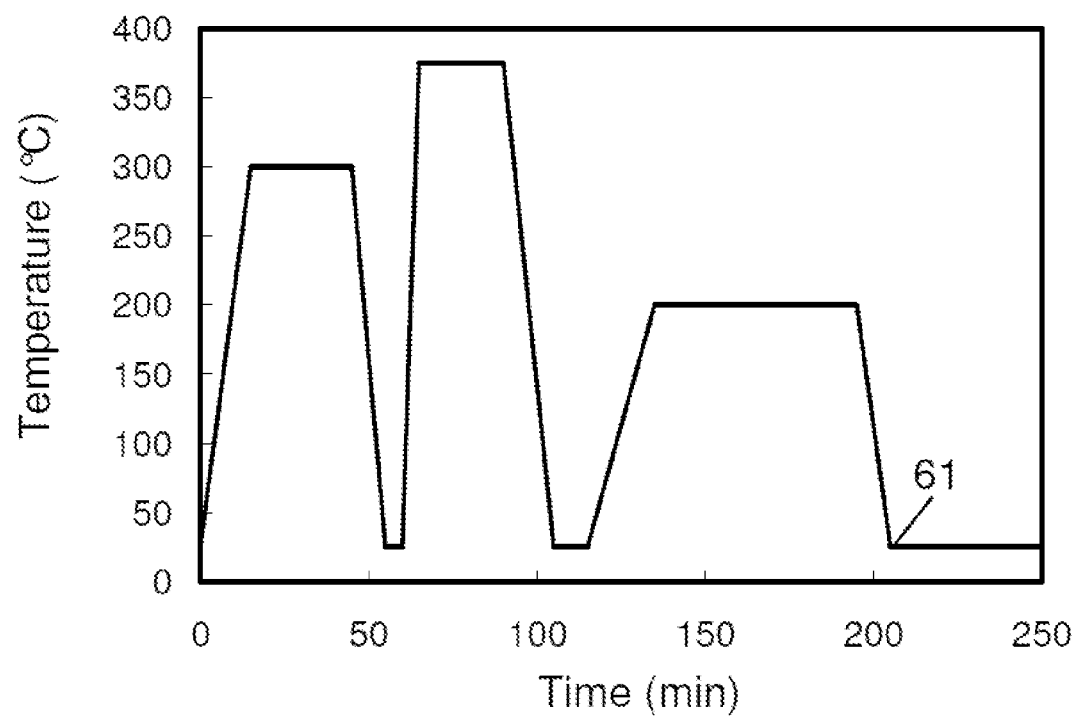
FIG. 6 is a non-limiting, representative plot of glass temperature versus time, i.e., a non-limiting, representative temperature profile, for a glass substrate during formation of an electronic component on the substrate.

FIG. 6' is a plot comparing measured isokom temperatures with isokom temperatures predicted using an equation for $\eta(T,x)$ of the type set forth in Eq. (1').

Figure 7:
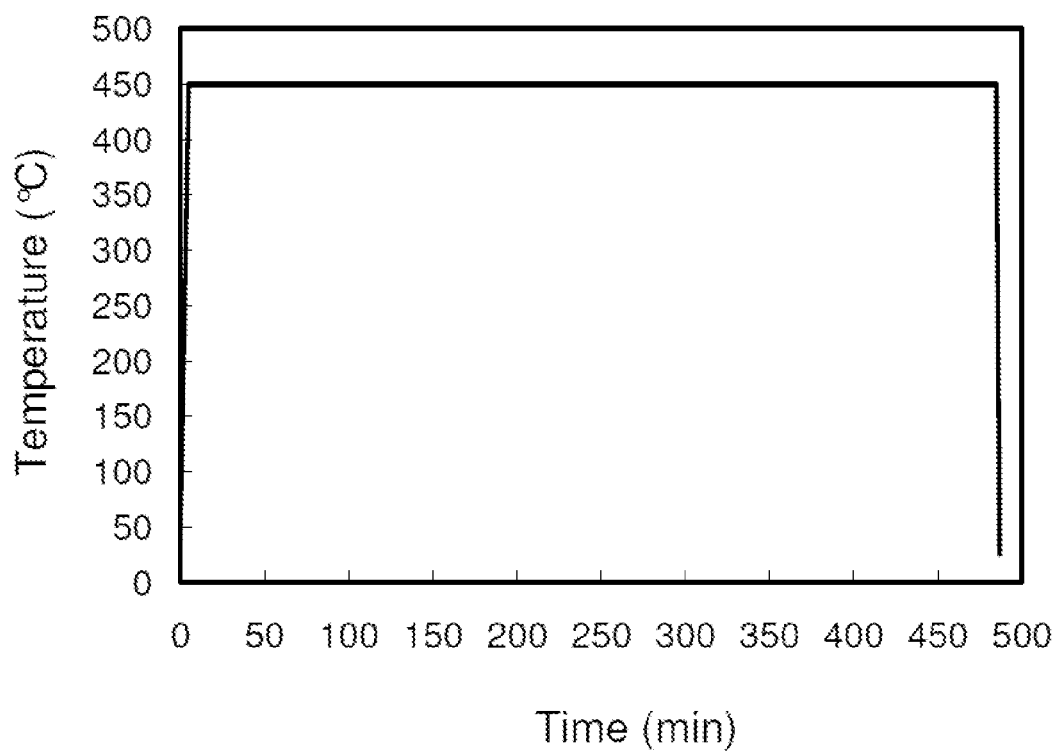
FIG. 7 is a non-limiting, representative plot of glass temperature versus time, i.e., a non-limiting, representative temperature profile, for a glass substrate during ion-exchange strengthening.

FIG. 7' is a plot comparing measured resistivity values with resistivity values predicted using an equation for $\rho(T,x)$ of the type set forth in Eq. (7').

DETAILED DESCRIPTION

Relaxation behavior is of critical importance for many glass products. For example, liquid crystal display glass is subjected to thermal treatments during deposition of transistors on the glass substrate. Relaxation of the glass during these heat treatment cycles can lead to compaction, i.e., a permanent change in the dimensions of the glass. The quality of high purity fused silica depends on obtaining a uniform thermal history throughout the glass; any uneven relaxation effect will lead to a deterioration of the quality of the final product through birefringence and optical inhomogeneity. When glass sheets are used as substrates and subjected to elevated temperature during processing, glass relaxation can cause thermal sag or creep. Low creep during customer processes can be a key aspect enabling successful products. In another context, the amount of Rayleigh scattering exhibited by glass optical fibers is controlled by density fluctuations in the glass, which exhibit nonmonotonic relaxation behavior as the glass relaxes.

Thus, accurate predictions/estimates of glass relaxation is vital to all glass products. There are two important factors governing glass relaxation: thermodynamics and kinetics. Thermodynamically, glass is a non-equilibrium system that would like to relax to the metastable supercooled liquid state. This relaxation typically involves a continuous change in the volume, enthalpy, and other properties of the glass as it approaches the liquid state. While the presence of a thermodynamic driving force is a necessary condition for glass relaxation, by itself it is insufficient since the glass must also have enough thermal energy and/or time to enable the kinetics of relaxation. Assuming isobaric conditions, the kinetics of the glass depend on three factors: composition, temperature, and thermal history. The importance of thermal history cannot be overstated, since the dynamics of two glasses of the same composition and at the same temperature can vary by many orders of magnitude depending on the details of thermal history.

In accordance with the present disclosure, methods and apparatus are provided for predicting/estimating the composition dependence of glassy dynamics. The techniques described herein are based on enthalpy landscape and temperature-dependent constraint theories, a discussion of which can be found in Mauro, et al., "Nonequilibrium Viscosity Of Glass," Physical Review B, 2009, 80:094204, the content of which in its entirety is incorporated herein by reference.

Example 1 set forth below illustrates the efficacy of the methods disclosed herein. This example uses display glass compositions, i.e., glass compositions which during their normal use undergo post-forming thermal treatments, and thus the glassy dynamics of these compositions are of particular relevance to purchasers of these glass articles. The example further illustrates the ability to use experimental data for one glass (Glass A) to predict non-equilibrium viscosities of another glass (Glass B) without the need to make measurements of the non-equilibrium behavior of the second glass. This is an important aspect of the present disclosure because, among other things, it allows glass scientists to identify suitable glass compositions for particular applications without the need to fully characterize the compositions' non-equilibrium behavior by measuring that behavior for each new composition.

In an embodiment, the methods and apparatus for predicting/estimating non-equilibrium viscosity disclosed herein have as their base an equation of the form:

$$\log_{10}\eta(T,T_f,x) = y(T,T_f,x)\log_{10}\eta_{eq}(T_f,x) + [1-y(T,T_f,x)]\log_{10}\eta_{ne}(T,T_f,x) \quad (1)$$

In this equation, $\eta$ is the glass's non-equilibrium viscosity which is a function of composition through the variable "x", $\eta_{eq}(T_f, x)$ is a component of $\eta$ attributable to the equilibrium liquid viscosity of the glass evaluated at fictive temperature $T_f$ for composition x (hereinafter referred to as the "first term of Eq. (1)"), $\eta_{ne}(T, T_f, x)$ is a component of $\eta$ attributable to the non-equilibrium glassy-state viscosity of the glass at temperature T, fictive temperature $T_f$, and composition x (hereinafter referred to as the "second term of Eq. (1)"), and y is an ergodicity parameter which satisfies the relationship: $0 \leq y(T, T_f, x) < 1$.

In an embodiment, $y(T, T_f, x)$ is of the form:

$$y(T, T_f, x) = \left[\frac{\min(T, T_f)}{\max(T, T_f)}\right]^{p(x_{ref})m(x)/m(x_{ref})} \quad (2)$$

(For convenience, the product $p(x_{ref})m(x)/m(x_{ref})$ will be referred to herein as "p(x)".)

This formulation for $y(T, T_f, x)$ has the advantage that through parameter values $p(x_{ref})$ and $m(x_{ref})$, Eq. (2) allows all the needed parameters to be determined for a reference glass composition $x_{ref}$ and then extrapolated to new target compositions x. The parameter p controls the width of the transition between equilibrium and non-equilibrium behavior in Eq. (1), i.e., when the value of $y(T, T_f, x)$ calculated from Eq. (2) is used in Eq. (1). $p(x_{ref})$ is the value of p determined for the reference glass, e.g., Glass A of Example 1, by fitting to experimentally measured data that relates to relaxation, e.g., by fitting to beam bending data and/or compaction data. The parameter m relates to the "fragility" of the glass, with m(x) being for composition x and $m(x_{ref})$ being for the reference glass. The parameter m is discussed further below.

In an embodiment, the first term of Eq. (1) is of the form:

$$\log_{10}\eta_{eq}(T_f, x) = \log_{10}\eta_\infty + (12 - \log_{10}\eta_\infty)\frac{T_g(x)}{T_f} \cdot \exp\left[\left(\frac{m(x)}{12 - \log_{10}\eta_\infty} - 1\right)\left(\frac{T_g(x)}{T_f} - 1\right)\right] \quad (3)$$

In this equation, $\eta_\infty = 10^{-2.9}$ Pa·s is the infinite-temperature limit of liquid viscosity, a universal constant, $T_g(x)$ is the glass transition temperature for composition x, and, as discussed above, m(x) is the fragility for composition x, defined by:

$$m(x) = \left.\frac{\partial \log_{10}\eta_{eq}(T, x)}{\partial (T_g(x)/T)}\right|_{T=T_g(x)} \quad (4)$$

Both the glass transition temperature for composition x and the composition's fragility can be expressed as expansions which employ empirically-determined fitting coefficients. Such expansions are discussed in detail in co-pending, commonly-assigned U.S. patent application Ser. No. 12/896,355, entitled "METHODS AND APPARATUS FOR PREDICTING GLASS PROPERTIES," which was filed on Oct. 1, 2010, the content of which in its entirety is hereby incorporated herein by reference.

As discussed in the above application, the glass transition temperature expansion can be derived from constraint theory, which makes the expansion inherently nonlinear in nature. The fragility expansion can be written in terms of a superposition of contributions to heat capacity curves, a physically realistic scenario. The net result of the choice of these expansions is that Eq. (3) can accurately cover a wide range of temperatures (i.e., a wide range of viscosities) and a wide range of compositions.

As a specific example of a constraint theory expansion of glass transition temperature, the composition dependence of $T_g$ can, for example, be given by an equation of the form:

$$T_g(x) = \frac{K_{ref}}{d - \sum_i x_i n_i / \sum_j x_j N_j}, \quad (5)$$

where the $n_i$'s are fitting coefficients, d is the dimensionality of space (normally, d=3), the $N_j$'s are the numbers of atoms in the viscosity-affecting components of the glass (e.g., N=3 for $SiO_2$, N=5 for $Al_2O_3$, and N=2 for CaO), and $K_{ref}$ is a scaling parameter for the reference material $x_{ref}$, the scaling parameter being given by:

$$K_{ref} = T_g(x_{ref}) \left( d - \frac{\sum_i x_{ref,i} n_i}{\sum_j x_{ref,j} N_j} \right), \quad (6)$$

where $T_g(x_{ref})$ is a glass transition temperature for the reference material obtained from at least one viscosity measurement for that material.

The summations in Eqs. (5) and (6) are over each viscosity-affecting component i and j of the material, the $x_i$'s can, for example, be expressed as mole fractions, and the $n_i$'s can, for example, be interpreted as the number of rigid constraints contributed by the various viscosity-affecting components. In Eqs. (5) and (6), the specific values of the $n_i$'s are left as empirical fitting parameters (fitting coefficients). Hence, in the calculation of $T_g(x)$ there is one fitting parameter for each viscosity-affecting component i.

As a specific example of a fragility expansion based on a superposition of heat capacity curves, the composition dependence of m can, for example, be given by an equation of the form:

$$m(x)/m_0 = \left(1 + \sum_i x_i \frac{\Delta C_{p,i}}{\Delta S_i}\right), \quad (7)$$

where $m_0 = 12 - \log_{10}\eta_\infty$, the $\Delta C_{p,i}$'s are changes in heat capacity at the glass transition, and the $\Delta S_i$'s are entropy losses due to ergodic breakdown at the glass transition. The constant $m_0$ can be interpreted as the fragility of a strong liquid (a universal constant) and is approximately equal to 14.9.

The values of $\Delta C_{p,i}/\Delta S_i$ in Eq. (7) are empirical fitting parameters (fitting coefficients) for each viscosity-affecting component i. Hence, the complete equilibrium viscosity model of Eq. (3) can involve only two fitting parameters per viscosity-affecting component, i.e., $n_i$ and $\Delta C_{p,i}/\Delta S_i$. Techniques for determining values for these fitting parameters are discussed in the above-referenced co-pending U.S. application incorporated herein by reference.

Briefly, in one embodiment, the fitting coefficients can be determined as follows. First, a set of reference glasses is chosen which spans at least part of a compositional space of interest, and equilibrium viscosity values are measured at a set of temperature points. An initial set of fitting coefficients is chosen and those coefficients are used in, for example, an equilibrium viscosity equation of the form of Eq. (3) to calculate viscosities for all the temperatures and compositions tested. An error is calculated by using, for example, the sum of squares of the deviations of log(viscosity) between calculated and measured values for all the test temperatures and all the reference compositions. The fitting coefficients are then iteratively adjusted in a direction that reduces the calculated error using one or more numerical computer algorithms known in the art, such as the Levenburg-Marquardt algorithm, until the error is adequately small or cannot be further improved. If desired, the process can include checks to see if the error has become "stuck" in a local minimum and, if so, a new initial choice of fitting coefficients can be made and the process repeated to see if a better solution (better set of fitting coefficients) is obtained.

When a fitting coefficient approach is used to calculate $T_g(x)$ and $m(x)$, the first term of Eq. (1) can be written more generally as:

$$\log_{10}\eta_{eq}(T,x) = C_1 + C_2 \cdot (f_1(x,FC1)/T) \cdot \exp([f_2(x,FC2)-1] \cdot [f_1(x,FC1)/T-1])$$

where:
(i) $C_1$ and $C_2$ are constants,
(ii) $FC1 = \{FC^1_1, FC^1_2 \ldots FC^1_i \ldots FC^1_N\}$ is a first set of empirical, temperature-independent fitting coefficients, and
(iii) $FC2 = \{FC^2_1, FC^2_2 \ldots FC^2_i \ldots FC^2_N\}$ is a second set of empirical, temperature-independent fitting coefficients.

Returning to Eq. (1), in an embodiment, the second term of Eq. (1) is of the form:

$$\log_{10}\eta_{ne}(T, T_f, x) = \quad (8)$$
$$A(x_{ref}) + \frac{\Delta H(x_{ref})}{kT\ln10} - \frac{S_\infty(x)}{k\ln10}\exp\left[-\frac{T_g(x)}{T_f}\left(\frac{m(x)}{12 - \log_{10}\eta_\infty} - 1\right)\right]$$

As can be seen, like Eq. (3), this equation depends on $T_g(x)$ and $m(x)$, and those values can be determined in the same manner as discussed above in connection with Eq. (3). A and $\Delta H$ could in principle be composition dependent, but in practice, it has been found that they can be treated as constants over any particular range of compositions of interest. Hence the full composition dependence of $\eta_{ne}(T, T_f, x)$ is contained in the last term of the above equation. The infinite temperature configurational entropy component of that last term, i.e., $S_\infty(x)$, varies exponentially with fragility. Specifically, it can be written as:

$$S_\infty(x) = S_\infty(x_{ref})\exp\left(\frac{m(x) - m(x_{ref})}{12 - \log_{10}\eta_\infty}\right) \quad (9)$$

As with $p(x_{ref})$ discussed above, the value of $S_\infty(x_{ref})$ for the reference glass can be obtained by fitting to experimentally measured data that relates to relaxation, e.g., by fitting to beam bending data and/or compaction data.

When a fitting coefficient approach is used to calculate $T_g(x)$ and $m(x)$, the second term of Eq. (1) can be written more generally as:

$$\log_{10}\eta_{ne}(T,T_f,x) = C_3 + C_4/T - C_5 \cdot \exp(f_2(x,FC2)-C_6) \cdot \exp([f_2(x,FC2)-1] \cdot [f_1(x,FC1)/T_f])$$

where:
(i) $C_3$, $C_4$, $C_5$, and $C_6$ are constants,
(ii) $FC1 = \{FC^1_1, FC^1_2 \ldots FC^1_i \ldots FC^1_N\}$ is a first set of empirical, temperature-independent fitting coefficients, and
(iii) $FC2 = \{FC^2_1, FC^2_2 \ldots FC^2_i \ldots FC^2_N\}$ is a second set of empirical, temperature-independent fitting coefficients.

When a fitting coefficient approach is used to calculate $T_g(x)$ and $m(x)$ for both the first and second terms of Eq. (1), those terms can be written more generally as:

$$\log_{10}\eta_{eq}(T,x) = C_1 + C_2 \cdot (f_1(x,FC1)/T) \cdot \exp([f_2(x,FC2)-1] \cdot [f_1(x,FC1)/T-1]),$$

and $$\log_{10}\eta_{ne}(T,T_f,x) = C_3 + C_4/T - C_5 \cdot \exp(f_2(x,FC2)-C_6) \cdot \exp([f_2(x,FC2)-1] \cdot [f_1(x,FC1)/T_f]),$$

where:
(i) $C_1$, $C_2$, $C_3$, $C_4$, $C_5$, and $C_6$ are constants,
(ii) $FC1=\{FC^1_1, FC^1_2 \ldots FC^1_i \ldots FC^1_N\}$ is a first set of empirical, temperature-independent fitting coefficients, and
(iii) $FC2=\{FC^2_1, FC^2_2 \ldots FC^2_i \ldots FC^2_N\}$ is a second set of empirical, temperature-independent fitting coefficients.

Although the use of glass transition temperature and fragility are preferred approaches for developing expressions for $f_1(x,FC1)$ and $f_2(x,FC2)$ in the above expressions, other approaches can be used, if desired. For example, the strain point or the softening point of the glass, together with the slope of the viscosity curves at these temperatures can be used.

As can be seen from Eqs. (1), (2), (3), (8), and (9), the computer-implemented model disclosed herein for predicting/estimating non-equilibrium viscosity can be based entirely on changes in glass transition temperature $T_g(x)$ and fragility $m(x)$ with composition x, which is an important advantage of the technique. As discussed above, $T_g(x)$ and $m(x)$ can be calculated using temperature dependent constraint theory and a superposition of heat capacity curves, respectively, in combination with empirically-determined fitting coefficients. Alternatively, $T_g(x)$ and $m(x)$ can be determined experimentally for any particular glass of interest, which is the approach used in Example 1 below.

In addition to their dependence on $T_g(x)$ and $m(x)$, Eqs. (1), (2), (3), and (8) also depend on the glass's fictive temperature $T_f$. A discussion of fictive temperature can be found in, for example, Mauro, et al., "Fictive Temperature and the Glassy State," J. Am. Ceram. Soc., 2009, 92:75-86, the content of which in its entirety is incorporated herein by reference. In accordance with the present disclosure, the calculation of the fictive temperature associated with the thermal history and glass properties of a particular glass composition can follow established methods, except for use of the non-equilibrium viscosity model disclosed herein to set the time scale associated with the evolving $T_f$. A non-limiting, exemplary procedure that can be used is as follows.

In overview, the procedure uses an approach of the type known as "Narayanaswamy's model" (see, for example, *Relaxation in Glass and Composites* by George Scherer (Krieger, Florida, 1992), chapter 10), except that the above expressions for non-equilibrium viscosity are used instead of Narayanaswamy's expressions (see Eq. (10.10) or Eq. (10.32) of Scherer).

A central feature of Narayanaswamy's model is the "relaxation function" which describes the time-dependent relaxation of a property from an initial value to a final, equilibrium value. The relaxation function M(t) is scaled to start at 1 and reach 0 at very long times. A typical function used for this purpose is a stretched exponential, e.g.:

$$M(t) = \exp\left(-\left(\frac{t}{\tau}\right)^b\right) \quad (10)$$

Other choices are possible, including:

$$M_s = \sum_{i=1}^{N} w_i \exp\left(-\alpha_i \frac{t}{\tau}\right) \quad (11)$$

where the $\alpha_i$ are rates that represent processes from slow to fast and the $w_i$ are weights that satisfy:

$$\sum_{i=1}^{N} w_i = 1 \quad (12)$$

The two relaxation function expressions of Eqs. (10) and (11) can be related by choosing the weights and rates to make $M_s$ most closely approximate M, a process known as a Prony series approximation. This approach greatly reduces the number of fitting parameters because arbitrarily many weights and rates N can be used but all are determined by the single stretched exponential constant b. The single stretched exponential constant b is fit to experimental data. It is greater than 0 and less than or equal to 1, where the value of 1 would cause the relaxation to revert back to single-exponential relaxation. Experimentally, the b value is found most often to lie in the range of about 0.4 to 0.7.

In Eqs. (10) and (11), t is time and $\tau$ is a time scale for relaxation also known as the relaxation time. Relaxation time is strongly temperature dependent and is taken from a "Maxwell relation" of the form:

$$\tau(T,T_f) = \eta(T,T_f)/G(T,T_f). \quad (13)$$

In this expression, $G(T, T_f)$ is a shear modulus although it need not be a measured shear modulus. In an embodiment, $G(T, T_f)$ is taken as a fitting parameter that is physically approximately equal to a measured shear modulus. $\eta$ is the non-equilibrium viscosity of Eq. (1), which depends on both T and $T_f$.

When relaxation proceeds during a time interval over which the temperature is changing, then the time dependence of both the temperature and the fictive temperature need to be taken into account when solving for time-varying fictive temperature. Because fictive temperature is involved in setting the rate of its own time dependence through Eq. (13), it shows up on both sides of the equation as shown below. Consistent with Eq. (11), it turns out that the overall fictive temperature $T_f$ can be represented as a weighted sum of "fictive temperature components" or modes in the form $$T_f = \sum_{i=1}^{N} w_i T_{fi} \quad (14)$$

using the same weights as before, i.e., the same weights as in Eqs. (11) and (12). When this is done, the time evolution of fictive temperature satisfies a set of coupled differential equations, where each of $T_f$, $T_{fi}$, and T are a function of time:

$$\frac{dT_{fi}}{dt} = \frac{\alpha_i}{\tau(T, T_f)}(T - T_{fi}) = \frac{G(T, T_f)\alpha_i}{\eta(T, T_f)}(T - T_{fi}), \quad (15)$$

$$i = 1 \ldots N.$$

Note that the time evolution of fictive temperature components depends on the present value of the overall fictive temperature $T_f$ through the role of setting the time scale of relaxation through the viscosity. In this approach, it is only the viscosity that couples together the behavior of all the fictive temperature components. Recalling that the rates $\alpha_i$ and the weights $w_i$ are fixed by the single value of the stretching exponent b, they and $G(T, T_f)$ can be taken to be time-independent, although other choices are possible. When numerically solving the set of N equations of Eq. (15), the techniques used need to take into account both the fact that individual equations can have wildly different time scales and the manner in which $T_f$ occurs on the right hand side inside the viscosity.

Once the fictive temperature components are known at any given time through Eq. (15), the fictive temperature itself is calculated using Eq. (14). In order to solve Eq. (15) by stepping forward in time it is necessary to have initial values for all the fictive temperature components. This can be done either by knowing their values based on previous calculations or else by knowing that all the fictive temperature components are equal to the current temperature at an instant of time.

Eventually all calculations must have started in this way at some earlier time, i.e., at some point in time, the glass material must be at equilibrium at which point all the fictive temperature components are equal to the temperature. Thus, all calculations must be traceable back to having started in equilibrium.

It should be noted that within this embodiment, all knowledge of the thermal history of the glass is encoded in the values of the fictive temperature components (for a given set of the weights and so forth that are not time-dependent). Two samples of the same glass that share identically the same fictive temperature components (again, assuming all other fixed model parameters are the same) have mathematically identical thermal histories. This is not the case for two samples that have the same overall $T_f$, as that $T_f$ can be the result of many different weighted sums of different $T_{fi}$'s.

The mathematical procedures described above can be readily implemented using a variety of computer equipment and a variety of programming languages or mathematical computation packages such as MATHEMATICA (Wolfram Research, Champaign, Ill.), MATLAB (MathWorks of Natick, Mass.), or the like. Customized software can also be used. Output from the procedures can be in electronic and/or hard copy form, and can be displayed in a variety of formats, including in tabular and graphical form. For example, graphs of the types shown in the figures can be prepared using commercially available data presentation software such as MICROSOFT's EXCEL program or similar programs. Software embodiments of the procedures described herein can be stored and/or distributed in a variety of forms, e.g., on a hard drive, diskette, CD, flash drive, etc. The software can operate on various computing platforms, including personal computers, workstations, mainframes, etc.

Without intending to limit it in any manner, the invention will be further illustrated by the following examples. Among other things, the examples illustrate representative applications of the technology disclosed herein to glass making and glass processing.

It should, of course, be understood that these particular examples are not limiting and the technology disclosed herein can be employed in a variety of ways to understand and/or to improve glass manufacturing and glass processing. Also, the technology can be used to discover new glass compositions and/or to identify existing compositions that meet a desired set of viscosity criteria. For example, non-equilibrium viscosity predictions based on the present disclosure can be used to guide experimental composition research, to pre-screen candidate glasses so as to reduce the number of compositions that need to be melted, and/or to reduce the number of viscosity measurements that need to be performed. Further applications for the technology disclosed herein will be evident to skilled persons from the present disclosure.

Example 1

This example illustrates the ability of Eqs. (1), (2), (3), and (8) to accurately predict/estimate the non-equilibrium viscosity of glass materials. In particular, this example uses beam bending experiments to establish that the above expressions accurately reproduce non-equilibrium viscosity for a range of glass compositions, temperatures, and thermal histories (i.e. fictive temperatures).

The beam bending tests used a rectangular beam of the glass material from which was hung a small weight. The beam was held at a fixed temperature and its small viscous deformations over time were accurately measured. The observed deflection and the underlying viscosity are related by $$y(t) = C \int_0^t \frac{dt'}{\eta(T(t'), T_f(t'))} \tag{16}$$

where y(t) is the deflection of the center of the beam at time t, $\eta$ is the non-equilibrium viscosity, and C is a standard beam-bending viscometry constant that takes account of the load hanging from the beam and the beam's geometry and is given by:

$$C = \frac{gL^3}{120wh^3}\left[M_{load} + \frac{\rho whL}{1.6}\right]. \tag{17}$$

In Eq. (17), g is the acceleration of gravity in cm/s$^2$, $\rho$ is the density of the glass bar in g/cm$^3$, $M_{load}$ is the total load mass in grams, L is the span or distance between supports, and w is the width and h is the (vertical) thickness of the beam. All of the lengths are measured in cm, such that the resulting C is in units of Pa-cm.

Two glasses were used in the experiments, one of which (Glass A) contained six components, i.e., SiO$_2$, Al$_2$O$_3$, B$_2$O$_3$, MgO, CaO, and SrO, and the other of which (Glass B) contained seven component, i.e., the same six as Glass 1 plus BaO. Both glasses were suitable for display applications, with Glass B having a higher strain point than Glass A.

The parameters used to model the non-equilibrium viscosity of the glasses are set forth in Table 1. Glass A was used as the reference glass and thus the parameters which are a function of $x_{ref}$ are for this glass. As noted above, $T_g(x)$ and m(x) are measured values for the two glasses.

The results for Glass A are shown in FIGS. 1-2 and those for Glass B in FIGS. 3-4. The curves in these figures are labeled by the temperature of the experiment (in degrees Celsius). All the experiments shown here were conducted under isothermal conditions.

In particular, FIG. 1 shows optimized model deflection curves for Glass A and FIG. 2 shows the corresponding viscosity curves. The solid curves are measured data from the beam bending experiments, and the dashed curves are model predictions obtained using the composition-dependent non-equilibrium viscosity model disclosed herein. The numbers next to the various curves are the temperatures in ° C. at which the beam was held during the experiments or assumed to be held during the modeling. The ability of the model to accurately predict/estimate glass dynamics is evident from these figures.

FIGS. 3 and 4 follow the same format as FIGS. 1 and 2 for Glass B. The holding temperatures are higher because Glass B is more heat resistant than Glass A. As noted above, the Glass B predicted behavior is based on Glass A as a reference glass with no additional fitting parameters.

The modeled viscosity and deflection of Glass B agree well with the experimental results. When the fictive temperature is much higher than the temperature where the beam is kept, the non-equilibrium viscosity component will play a more important role than the equilibrium component. This is shown in the beginning part of the deflection measurement. The high accuracy of this part proves the success of the composition-dependent non-equilibrium viscosity model. When the fictive temperature approaches the real temperature at long times, the equilibrium viscosity takes charge of the whole viscosity. The high accuracy for this part of the viscosity curve is good proof of the composition dependent equilibrium viscosity and also the $T_g$ and m values used in the model.

Example 2

This example illustrates the use of the computer-implemented model discussed above to predict/estimate compaction of a glass article when the article is subjected to a post-forming thermal treatment. A representative example of a glass article for which compaction estimation is important is a glass substrate used in the manufacture of a display, such as, a liquid crystal display (LCD).

Glass substrates are typically produced by forming a glass ribbon from molten glass and then cutting individual glass sheets from the ribbon, which are subjected to various finishing operations prior to being provided to a display manufacturer. The glass ribbon can be produced by various techniques including the float and fusion processes. In each case, the process begins with molten glass which then goes through a cooling process, i.e., a known (given) temperature profile. The profile can be determined in various ways, a typical technique being to measure the temperature of the glass as it cools from the molten state using, for example, IR detectors.

FIG. 5 shows a representative temperature profile for a fusion process. In this figure, vertical lines 51 and 52 divide the profile into three parts, the glass being in equilibrium with the ambient temperature to the left of line 51, being in transition to a solid state between lines 51 and 52 and thus no longer in equilibrium, and in a solid state to the right of line 52. As will be evident, the portion of the temperature profile to the right of line 52 includes cooling of the glass down to room temperature, whereupon it can be finished and shipped to a display manufacturer.

As discussed above in connection with Eq. (15), the thermal history of the glass shown in FIG. 5 can be expressed by a set of $T_{fi}$'s obtained by solving Eq. (15) for the temperature profile that the glass has experienced from the time it was in equilibrium, i.e., when it was to the left of line 51, until it was in a solid state, i.e., when it was to the right of line 52. This temperature profile is introduced into Eq. (15) through the T variable (temperature variable) which is a function of time. By determining the $T_{fi}$'s, the thermal history of the glass prior to any post-forming thermal treatment is captured in a manner which can be subsequently used in the non-equilibrium viscosity equations disclosed above.

For a glass substrate, the post-forming thermal treatment comes about as a result of the formation of electronic components on the substrate. The specifics of the thermal treatment will, of course, depend on the electronic components being produced, but as a general proposition, the thermal treatment includes a number of heating and cooling cycles. FIG. 6 shows a representative temperature profile for a typical post-forming thermal treatment used to produce (deposit) thin film transistors on a glass substrate.

To determine the compaction of the substrate due to a temperature profile of the type shown in FIG. 6, one begins with the $T_{fi}$'s determined for the temperature profile of FIG. 5. Using the $T_{fi}$'s, Eqs. (1), (2), (3), (8), and (14) are solved at a series of time points, where the T values in Eqs. (1), (2), and (8) are those of FIG. 6, and the x, $T_g(x)$, m(x), p(x), and $S_\infty(x)/k \ln 10$ values used in these equations are those of the glass making up the substrate. For example, these parameters can have values like those set forth in Table 1. It should be noted that Eq. (3) implicitly depends on the T values at the series of time points through its $T_f$ variable, which is calculated using Eq. (14) at each time point. Eq. (14) implicitly depends on the T values through the solution of Eq. (15) for the $T_{fi}$ values at each time point.

The resulting non-equilibrium viscosity versus time values obtained by solving Eqs. (1), (2), (3), (8), and (14) are then converted into fictive temperatures which, in turn, are converted into compaction values at one or more of the time points. In particular, compaction is defined as a linear strain of the glass at room temperature induced by the thermal cycle. Compaction (ε) can be calculated as the product of the configurational coefficient of thermal expansion ($\alpha_{config}$) times the change in fictive temperature due to the thermal cycle, where by convention, a negative value of ε indicates shrinkage and a positive value indicates expansion:

$$\varepsilon = \alpha_{config}(T_f(t_1) - T_f(t_0)) \quad (18)$$

where $T_f(t_0)$ is the fictive temperature at the beginning of the thermal cycle, e.g., at the end of the temperature profile of FIG. 5, and $T_f(t_1)$ is the fictive temperature at the time of interest $t_1$ which often will be the end of the post-forming thermal treatment, e.g., at time point 61 in FIG. 6.

If the magnitude of the compaction value calculated from Eq. (18) is greater than desired, the computer-implemented model disclosed herein can be used to investigate potential changes that will improve the compaction. For example, the temperature profile of FIG. 5 and/or FIG. 6 can be varied and the calculations repeated to determine the direction and magnitude of the resulting predicted/estimated compaction.

Importantly, in addition to changing temperature profiles, the computer-implemented model disclosed herein allows for the composition of the glass to be changed and the calculations repeated with a new set of x, $T_g(x)$, m(x), p(x), and $S_\infty(x)/k \ln 10$ values. As discussed above, when the composition is changed, Eqs. (5), (7), and (9), and their associated equations, can be used to calculate the new $T_g(x)$, m(x), p(x), and $S_\infty(x)/k \ln 10$ values based on fitting parameters obtained for reference glasses having compositions appropriate to the glass being studied for compaction. This is an important advantage of the technology disclosed herein since it is often easier to change glass composition than to change temperature profiles.

Example 3

This example illustrates the use of the computer-implemented model discussed above to predict/estimate stress relaxation of a glass article when the article is subjected to a post-forming thermal treatment. A representative example of a glass article for which stress relaxation is important is a glass substrate used in the manufacture of a portable electronic device, in particular, a glass substrate used to produce a scratch-resistant touch screen for such a device.

The scratch-resistant properties of such substrates can be produced by ion-exchange strengthening of the substrate. The ion-exchange process involves submerging the substrate in a molten salt bath at an elevated temperature and holding the substrate in the bath at that temperature to allow the ion-exchange process to take place. FIG. 7 shows a representative temperature profile for such an ion-exchange strengthening process. The ion-exchange process produces a compressive stress on the glass which gives the glass its elevated strength. However, the elevated temperature used to achieve ion-exchange allows the glass to relax and thus reduce the amount of stress and associated strengthening achieved by the ion exchange. Accordingly, the ability to predict/estimate the stress relaxation during ion-exchange allows a glass manufacturer to optimize the strengthening process.

The stress relaxation calculations follow a pattern similar to that described above in Example 2 for compaction. Thus, the calculations begin with a temperature profile for the forming process, e.g., a profile of the type shown in FIG. 5, and based on that profile, a set of $T_{fi}$'s are calculated to represent the thermal history of the glass at the end of the forming process. Next, as with compaction, the non-equilibrium viscosity of the glass at a series of time points is calculated using the temperature profile of the ion-exchange process, e.g., a profile of the type shown in FIG. 7. The non-equilibrium viscosity is then used to set the time scale for the stress relaxation of the glass as it is undergoing the stress enhancement from the ion exchange. Various techniques can be used to calculate the net effect of the competition between stress enhancement and stress relaxation, e.g., a commercial mechanical engineering software package such as that sold by ANSYS (Canonsburg, Pa.) can be used to model the overall process using the time scale obtained from the computer-implemented model disclosed herein.

As with compaction, if the calculated net stress is less than desired, variations can be made in the temperature profiles, such as the profiles of FIGS. 5 and 7, and/or in the composition of the glass. Again, being able to incorporate the effect of composition on stress relaxation is an important advantage of the technology disclosed herein. It should be noted that following analogous techniques, stress relaxation during forming of the glass article can also be predicted/estimated if desired.

Example 4

This example illustrates the use of the computer-implemented model discussed above to predict/estimate thermal sag or thermal creep. A representative example of a glass article for which thermal sag or thermal creep is important is a glass substrate used in the manufacture of a photovoltaic panel. The problem of thermal sag/creep arises because when heated to an elevated temperature, a substrate can acquire a shape which becomes locked into (frozen into) the substrate when the substrate is cooled back to room temperature.

Figure 8:
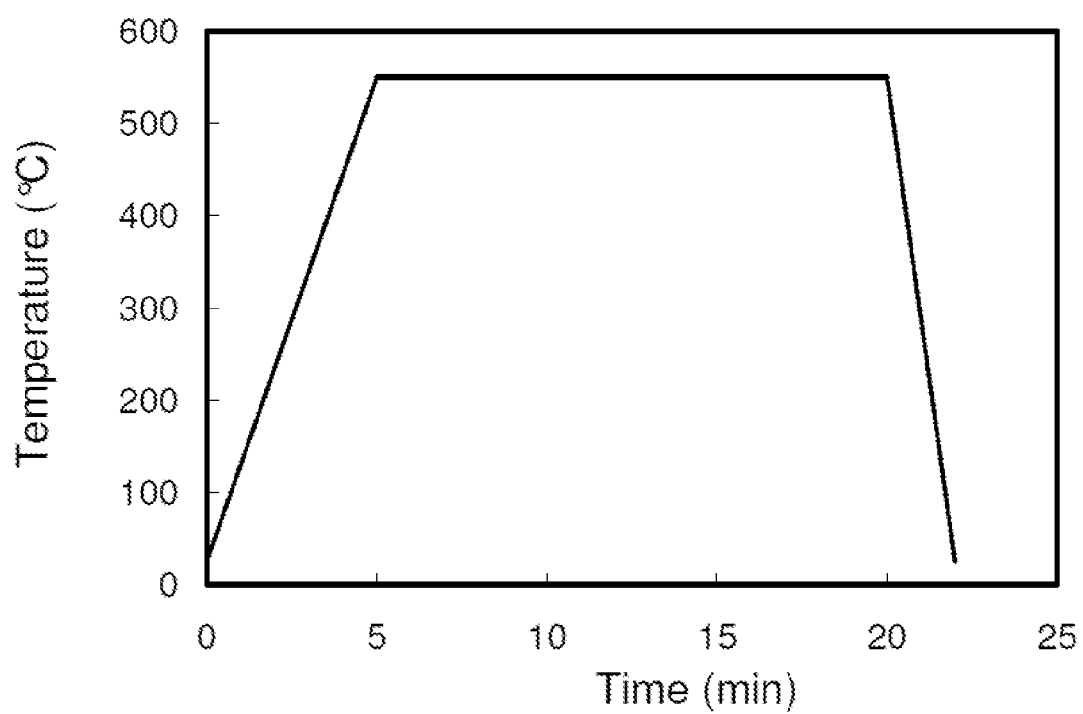
FIG. 8 is a non-limiting, representative plot of glass temperature versus time, i.e., a non-limiting, representative temperature profile, for a glass substrate during formation of a photovoltaic device on the substrate.
Figure 1:
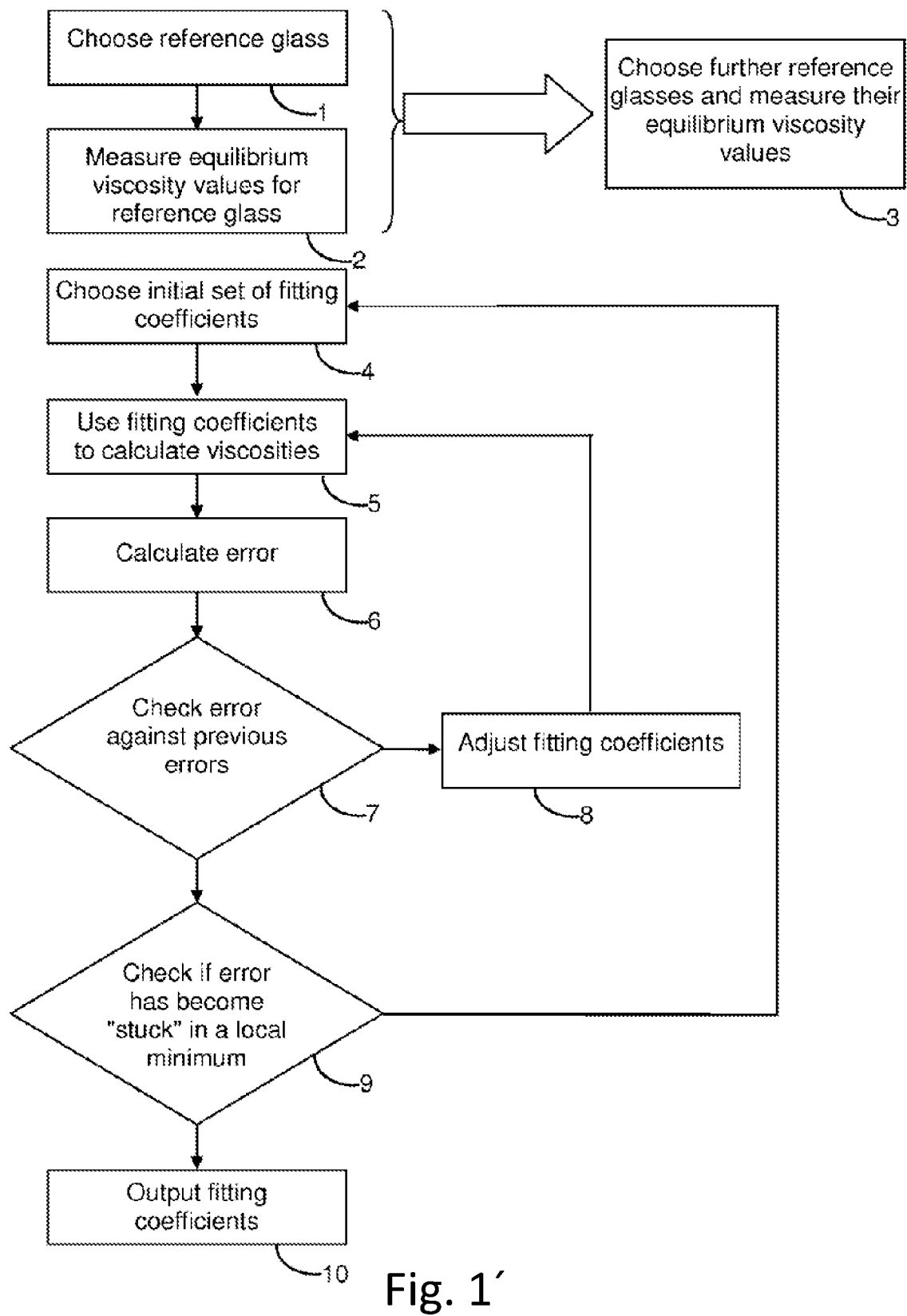
Figure 2:
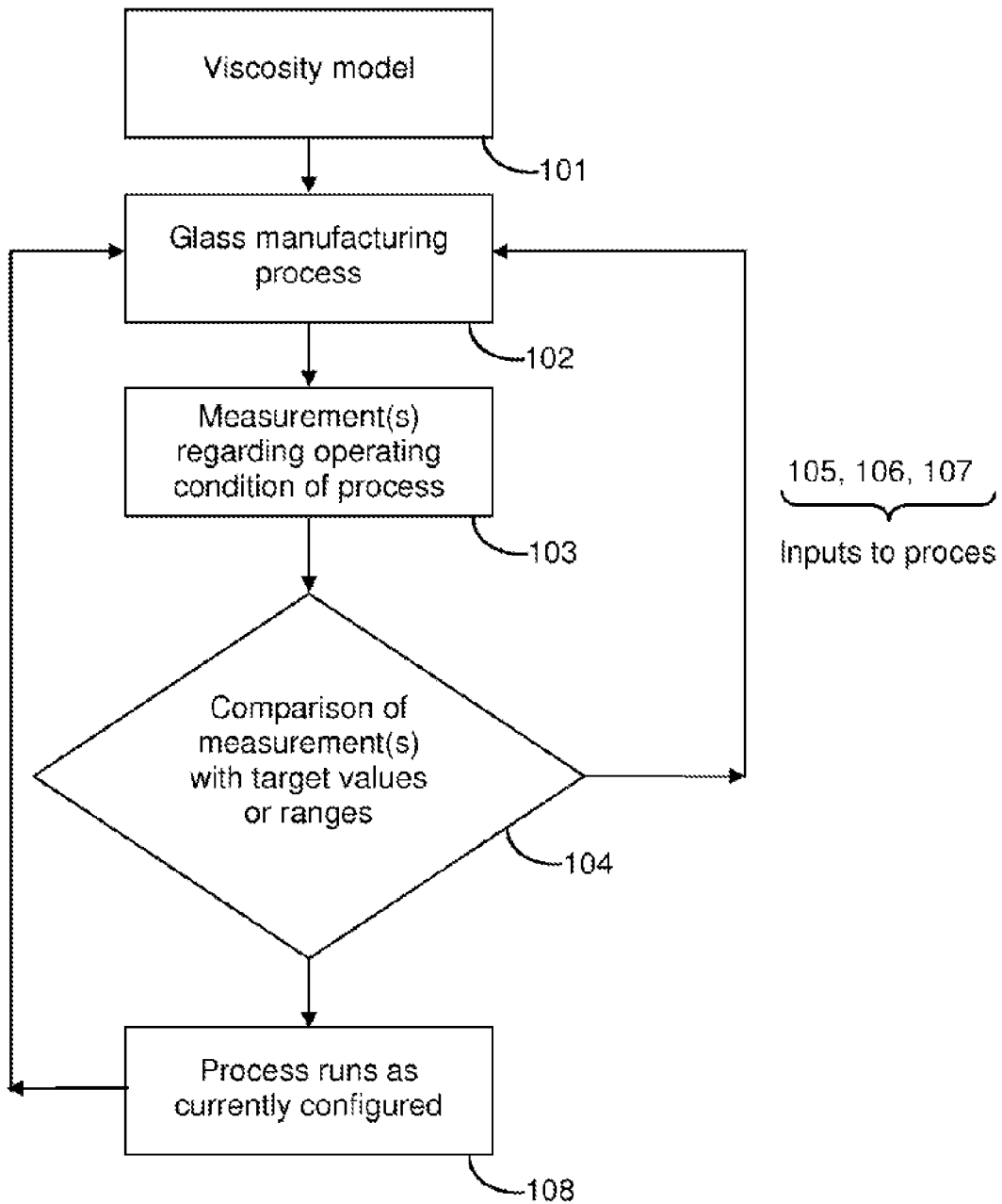
Figure 3:
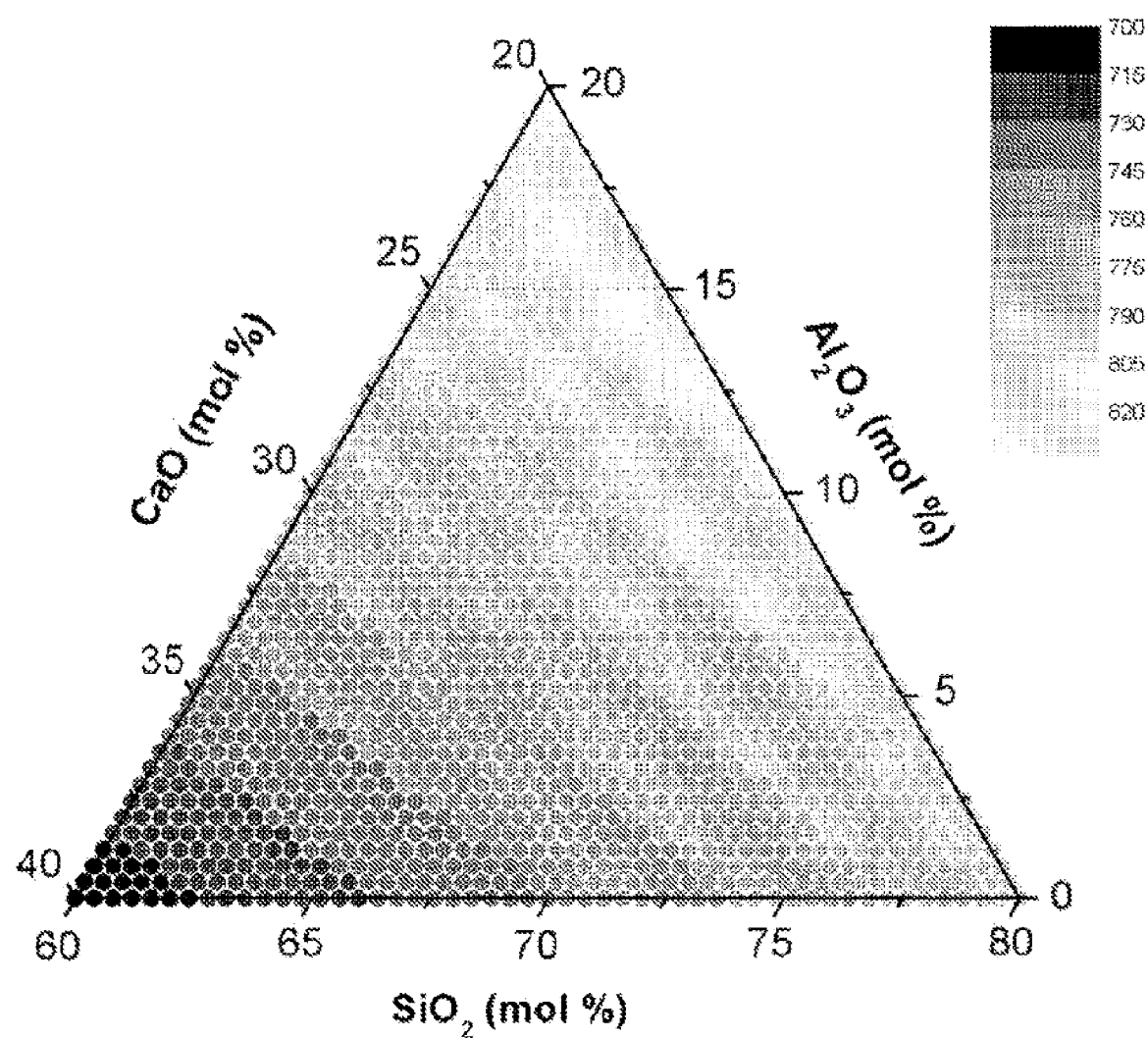
Figure 7:
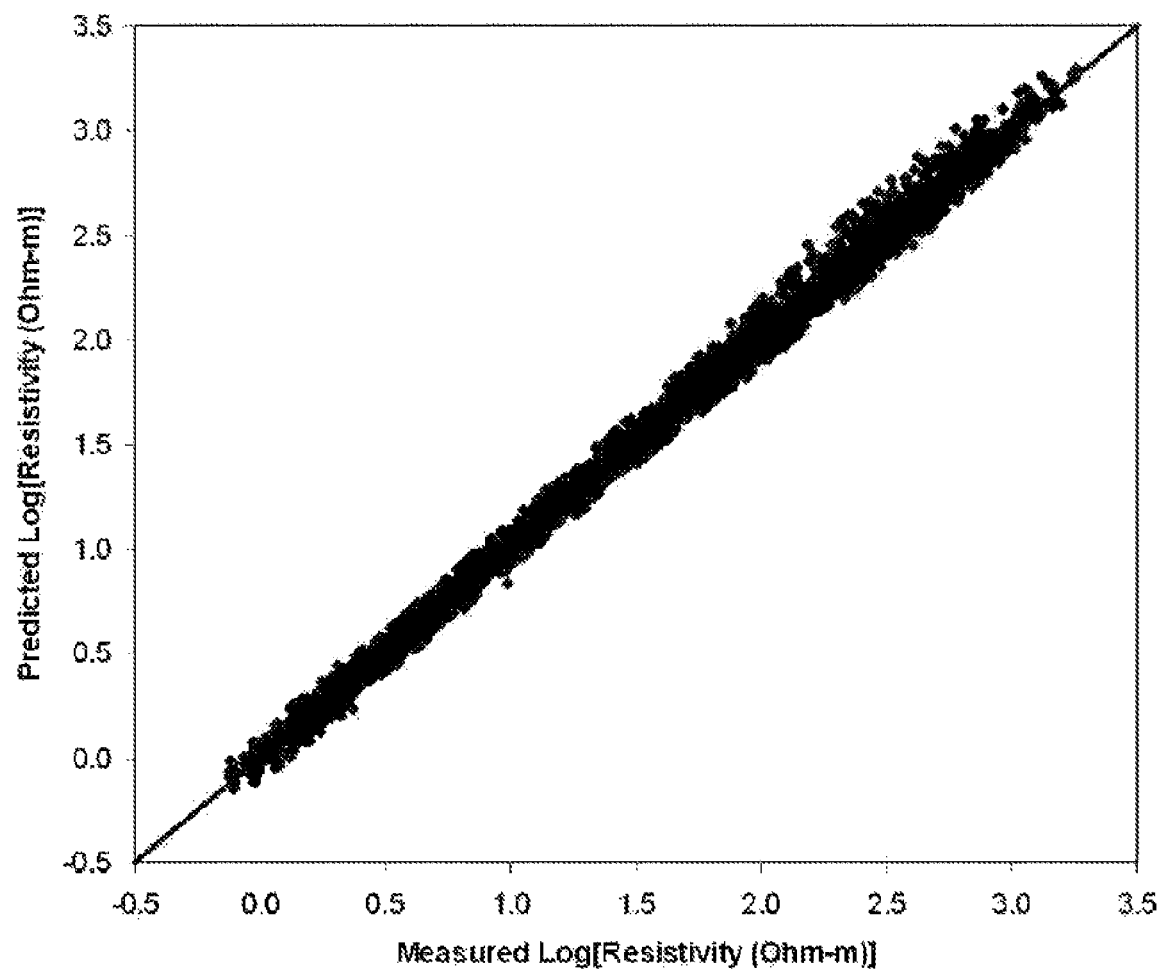

Again, the process begins with calculating a set of $T_{fi}$'s to represent the thermal history of the glass during formation, e.g., a thermal history of the type shown in FIG. 5. As with compaction and ion-exchange strengthening, a set of non-equilibrium viscosity values are then obtained for the temperature profile which the substrate is subjected to during manufacture of the photovoltaic panel. FIG. 8 illustrates a representative profile for such processing. The non-equilibrium viscosity values can then be used in, for example, a commercial mechanical engineering software package which, for example, employs a finite-element technique to model spatial behavior and thus predict the amount of sag/creep that the substrate will undergo. In some cases, the sag/creep can be estimated by using the behavior of a beam composed of the glass of interest, in which case an analytical solution of the type discussed above in connection with Eqs. (16) and (17) can be used.

As with other applications of the computer-implemented model, e.g., the compaction and ion-exchange strengthening applications discussed above in Examples 2 and 3, if the sag/creep is greater than desired, the model can be used to estimate/predict the effects of temperature profiles (thermal profiles) and/or glass composition on the behavior of the substrate during post-forming processing.

From the foregoing, it can be seen that improved techniques for predicting/estimating the properties of glass materials, specifically, a glass's non-equilibrium viscosity, have been provided. A variety of modifications that do not depart from the scope and spirit of the invention will be evident to persons of ordinary skill in the art from this disclosure. The following claims are intended to cover the specific embodiments set forth herein as well as modifications, variations, and equivalents of those embodiments.

TABLE 1

| Parameter | Units | Glass A | Glass B |
|---|---|---|---|
| log η∞ | log Pa-s | −2.9 | −2.9 |
| $T_g$ (x) | ° C. | 734.5 | 794 |
| m (x) | — | 35.3 | 36.8 |
| p (x) | — | 10.88 | 11.34 |
| A | log Pa-s | 45.19 | 45.19 |
| ΔH/k ln 10 | K | 4136.7 | 4136.7 |
| S∞(x)/k ln 10 | — | 135.09 | 149.40 |

As indicated in original paragraphs above, the entire content of commonly-assigned U.S. patent application Ser. No. 12/896,355, entitled "METHODS AND APPARATUS FOR PREDICTING GLASS PROPERTIES," filed on Oct. 1, 2010, has been incorporated in the present Application by reference, and much of which is now transcribed. Prime marks (') denote reference numbers of U.S. application Ser. No. 12/896,355. No new matter is added.

This disclosure relates to methods and apparatus for predicting the equilibrium viscosity and/or electrical resistivity of glasses and/or glass-forming liquids (hereinafter referred to as "glass materials" or simply "materials").

More particularly, it relates to measuring the viscosities and/or resistivities of a plurality of glass materials at a plurality of temperatures, using the measured viscosities and/or resistivities and a programmed computer to obtain empirical fitting constants, and then using the empirical fitting constants and a programmed computer to predict viscosities and/or resistivities for the same and/or different glass materials at the same and/or different temperatures.

Bold letters are used herein to indicate parameters and/or variables which comprise a set of values and thus may be thought of as a vector, i.e., x is used to represent a composition vector, and FC1, FC2, FC$^p$1, and FC$^p$2 are used to represent fitting coefficient vectors.

The terms "viscosity," "shear viscosity," and "equilibrium viscosity" are used interchangeably herein to refer to equilibrium shear viscosity.

The terms "resistivity" and "electrical resistivity" are used interchangeably herein to refer to electrical resistivity.

All viscosities referred to herein are assumed to have been divided by their units, e.g., Pa-s, to make numbers upon which the log function can operate. Similarly, all electrical resistivities are assumed to have been divided by their units, e.g., ohm-meters.

As used herein, the glass transition temperature of a material is the temperature at which it has a viscosity of $10^{12}$ Pa-s.

The problem of predicting the properties of glass materials has been a longstanding one in the field of glass and glass-ceramic chemistry. Because most glasses and glass-ceramics (hereinafter referred to collectively as "glasses") contain a relatively large number of components, e.g., three to a half-a-dozen or more in many cases, the compositional space is multi-dimensional, making experimental study of the entire space economically impractical. Yet, from melting through to forming, the production of glass articles would clearly benefit from an ability to predict glass properties based on glass composition or, conversely, to select glass compositions based on desired properties.

Among all the technologically useful properties of a glass-forming system, the shear viscosity η of the melt is undoubtedly the most important. Every stage of industrial glass production—from the initial melting, mixing, and fining to the final forming operations—requires careful control of shear viscosity. For example, shear viscosity controls the rates of melting and of fining in a glass melting tank. Similarly, each glass forming operation, e.g., fiber forming or the final annealing of container glass, requires a certain well-defined viscosity range and consequently a specific temperature range for that operation. See, for example, Varshneya AK (2006) *Fundamentals of Inorganic Glasses*, 2nd ed. (Society of Glass Technology, Sheffield, UK). Viscosity also determines the relaxation rate of a final glass product. For example, viscosity controls the compaction behavior of display glasses (e.g., the glass sheets used as substrates in the production of liquid crystal displays) during customer heat treatment cycles. It should thus come as no surprise that the details of the viscosity-temperature relationship play a critical role in researching new glass compositions for display and other applications.

Among other reasons, the problem of relating viscosity to temperature and composition is challenging because from the initial glass melting to final forming, viscosity varies by over twelve orders of magnitude. See, for example, Varshneya (2006), supra. Viscosity is also sensitive to small changes in composition, especially in silicate melts where small levels of impurities can have a profound influence on the flow behavior. It is thus of great importance to have accurate knowledge of the scaling of viscosity with both composition (x) and temperature (T). Unfortunately, measurement of η(T,x) is challenging for high temperature melts, and low temperature measurements (i.e., in the high viscosity range, $10^{10}$ to $10^{15}$ Pa-s) are time consuming and often prohibitively expensive. See, for example, Varshneya (2006), supra. It is therefore of great interest to develop an accurate model of η(T,x).

Resistive furnaces require melts within a range of electrical resistivity values to ensure proper glass melting behavior and to avoid destruction of the tank refractory. The electrical resistivity of disordered media has drawn much interest from physicists due to the strong frequency dependence of the measured conductivity. See, for example, J. C. Dyre, P. Maass, B. Roling, and D. L. Sidebottom, "Fundamental Questions Relating to Ion Conduction in Disordered Solids," *Rep. Prog. Phys.*, 72, 046501 (2009). This frequency dependence is a direct result of inhomogeneities leading to a distribution of activation barriers for electrical conduction. While the universal frequency dependence of ac conductivity has received much attention, there has been little work addressing the temperature and composition dependences of conductivity at a fixed frequency. Most models assume an Arrhenius dependence of resistivity with temperature, despite the fact that as recognized as part of this disclosure, the same inhomogeneities that lead to a frequency-dependent conductivity must also lead to a non-Arrhenius dependence on temperature. As to the composition dependence of resistivity, the work that exists is based on strictly empirical fits, e.g., on Taylor series expansions of the coefficients of the Vogel-Fulcher-Tammann (VFT) relation. See, for example, O. V. Mazurin and O. A. Prokhorenko, "Electrical Conductivity of Glass Melts," in *Properties of Glass-Forming Melts*, ed. by L. D. Pye, A. Montenero, and I. Joseph, pp. 295-338 (CRC Press, Taylor & Francis Group, Boca Raton, Fla., 2005); and A. Fluegel, D. A. Earl, and A. K. Varshneya, "Electrical Resistivity of Silicate Glass Melts Calculation Based on the SciGlass Database," available online at http://glassproperties.com (2007).

Pavel Hrma of the Pacific Northwest National Laboratory (Richland, Wash.) reports an empirical model for the dependence of equilibrium viscosity as a function of temperature and composition. See P. Hrma, "Glass viscosity as a function of temperature and composition: A model based on Adam-Gibbs equation," *J. Non-Cryst. Solids*, 354, 3389-3399 (2008). Hrma's model is based on the Adam-Gibbs equation, with the assumption in Hrma's Eq. (4) of a power law dependence for the configurational entropy. This assumption can lead to zero entropy (i.e., infinite viscosity) at a finite temperature, a physically dubious result. From a practical point of view, this means that viscosity predictions based on Hrma's model will suffer at low temperatures (i.e., high viscosities).

As to the composition dependence of viscosity, in Eqs. (8) and (9), Hrma includes composition dependence via linear expansions of the glass transition temperature and his $s_0$ parameter in terms of the oxide components of the glass. However, as recognized as part of this disclosure, glass transition temperature cannot be expanded in such a manner over a wide range of compositions. For example, in borosilicate glasses the addition of sodium first causes a conversion of boron from three to four coordination, increasing the glass transition temperature. Then additional sodium creates non-bridging oxygens which subsequently decrease the glass transition temperature. Other examples include alkali or alkaline earth addition to aluminosilicate glasses and mixed alkali silicate glasses. Consequently, Hrma's linear expansion of the glass transition temperature is valid over only a narrow range of compositions. Hrma's second expansion is a linear expansion of his so parameter with respect to the oxide composition. As recognized as part of this disclosure, Hrma's expansion of $s_0$ is analogous to an expansion of the $T_0$ parameter in the VFT expansion. This is also unphysical. The result of this expansion is an overprediction of low temperature viscosities and an overprediction of fragility.

In view of this state of the art, a need exists for more effective methods and apparatus for predicting the properties of glass materials and, in particular, for predicting the dependence of viscosity and/or resistivity on temperature and/or composition. The present disclosure addresses these problems.

In accordance with a first aspect, for a material that (a) is a glass or glass-forming liquid and (b) includes N viscosity-affecting components, a method is disclosed that includes:

(A) using a computer to evaluate an equation which relates equilibrium viscosity η and temperature T and has the following form:

$$\log^{10}\eta(T,x)=C_1+C_2\cdot(f_1(x,FC1)/T)\cdot\exp([f_2(x,FC2)-1]\cdot[f_1(x,FC1)/T-1])$$

where
(i) $C_1$ and $C_2$ are constants,
(ii) $x=\{x_1, x_2, \ldots x_i \ldots x_N\}$ are the concentrations of the N viscosity-affecting components,
(iii) $FC1=\{FC^1_1, FC^1_2 \ldots FC^1_i \ldots FC^1_N\}$ is a first set of empirical, temperature-independent fitting coefficients, one coefficient for each of the N viscosity-affecting components, and
(iv) $FC2=\{FC^2_1, FC^2_2 \ldots FC^2_i \ldots FC^2_N\}$ is a second set of empirical, temperature-independent fitting coefficients, one coefficient for each of the N viscosity-affecting components; and (B) using the results of step (A) to provide at least one of: (i) a predicted equilibrium viscosity η of the material at a temperature T, and (ii) a predicted temperature T at which the material has an equilibrium viscosity η.

In accordance with a second aspect, a method is disclosed for identifying at least one material expected to have at least one desired η, T pair, where η is equilibrium viscosity and T is temperature, the method including:

(A) selecting at least one candidate material which includes N viscosity-affecting components having selected concentrations, where N may be different for different candidate materials;

(B) using a computer to obtain at least one η,T pair for the at least one candidate material of step (A) by evaluating an expression of the form $$\log_{10}\eta(T,x)=C_1+C_2\cdot(f_1(x,FC1)/T)\cdot\exp([f_2(x,FC2)-1]\cdot[f_1(x,FC1)/T-1])$$

where
(i) $C_1$ and $C_2$ are constants,
(ii) $x=\{x_1, x_2, \ldots x_i \ldots x_N\}$ are the concentrations of the N viscosity-affecting components,
(iii) $FC1=\{FC^1_1, FC^1_2 \ldots FC^1_i \ldots FC^1_N\}$ is a first set of empirical, temperature-independent fitting coefficients, one coefficient for each of the N viscosity-affecting components, and
(iv) $FC2=\{FC^2_1, FC^2_2 \ldots FC^2_i \ldots FC^2_N\}$ is a second set of empirical, temperature-independent fitting coefficients, one coefficient for each of the N viscosity-affecting components;

(C) comparing the at least one η,T pair resulting from step (B) with the at least one desired η,T pair; and (D) repeating steps (A) to (C) as necessary until at least one candidate material is selected in step (A) which gives at least one η,T pair in step (B) which satisfies at least one selected criterion relative to the at least one desired η,T pair, said at least one candidate material being the at least one material expected to have the at least one desired η,T pair.

In accordance with a third aspect, a method is disclosed for determining a relationship between temperature T and viscosity η for a material that (i) is a glass or glass-forming liquid and (ii) includes N viscosity-affecting components, the method including:

(a) measuring the viscosity of a plurality of reference materials at a plurality of temperatures; and (b) using a programmed computer, fitting a function of the form $$\log_{10}\eta(T,x)=C_1+C_2\cdot(f_1(x,FC1)/T)\cdot\exp([f_2(x,FC2)-1]\cdot[f_1(x,FC1)/T-1])$$

to the measured viscosities of step (a) to determine values for FC1 and FC2, where in said function:
(i) $C_1$ and $C_2$ are constants,
(ii) $x=\{x_1, x_2, \ldots x_i \ldots x_N\}$ are the concentrations of the N viscosity-affecting components,
(iii) $FC1=\{FC^1_1, FC^1_2 \ldots FC^1_i \ldots FC^1_N\}$ is a first set of temperature-independent coefficients, one coefficient for each of the N viscosity-affecting components, and
(iv) $FC2=\{FC^2_1, FC^2_2 \ldots FC^2_i \ldots FC^2_N\}$ is a second set of temperature-independent coefficients, one coefficient for each of the N viscosity-affecting components, the function and the values for FC1 and FC2 determined in step (b) constituting the relationship between viscosity and temperature for the material.

In accordance with a fourth aspect, for a material that (a) is a glass or glass-forming liquid and (b) includes N' resistivity-affecting components, a method is disclosed that includes:

(A) using a computer to evaluate an equation which relates resistivity ρ and temperature T and has the following form:

$$\log_{10}\rho(T,x)=C^\rho_1+C^\rho_2\cdot(f_1(x,FC^\rho 1)/T)\cdot\exp([f_2(x,FC^\rho 2)-1]\cdot[f_1(x,FC^\rho 1)/T-1])$$

where
(i) $C^\rho_1$ and $C^\rho_2$ are constants,
(ii) $x=\{x_1, x_2, \ldots x_i \ldots x_{N'}\}$ are the concentrations of the N' resistivity-affecting components,
(iii) $FC^\rho 1=\{FC^\rho_1, FC^\rho_2 \ldots FC^\rho_i \ldots FC^\rho_{N'}\}$ is a first set of empirical, temperature-independent fitting coefficients, one coefficient for each of the N' resistivity-affecting components, and
(iv) $FC^\rho 2=\{FC^\rho_1, FC^\rho_2 \ldots FC^\rho_i \ldots FC^\rho_{N'}\}$ is a second set of empirical, temperature-independent fitting coefficients, one coefficient for each of the N' resistivity-affecting components, and (B) using the results of step (A) to provide at least one of: (i) a predicted resistivity ρ of the material at a temperature T, and (ii) a predicted temperature T at which the material has a resistivity ρ.

In accordance with a fifth aspect, a method is disclosed for identifying at least one material expected to have at least one desired ρ,T pair, where ρ is resistivity and T is temperature, the method including:

(A) selecting at least one candidate material which includes N' resistivity-affecting components having selected concentrations, where N' may be different for different candidate materials;

(B) using a computer to obtain at least one ρ,T pair for the at least one candidate material of step (A) by evaluating an expression of the form $$\log_{10}\rho(T,x)=C^\rho_1+C^\rho_2\cdot(f_1(x,FC^\rho 1)/T)\cdot\exp([f_2(x,FC^\rho 2)-1]\cdot[f_1(x,FC^\rho 1)/T-1])$$

where
(i) $C^\rho_1$ and $C^\rho_2$ are constants,
(ii) $x=\{x_1, x_2, \ldots x_i \ldots x_{N'}\}$ are the concentrations of the N' resistivity-affecting components, (iii) $FC^p1=\{FC^p_1, FC^p_2 \ldots FC^p_i \ldots FC^p_{N'}\}$ is a first set of empirical, temperature-independent fitting coefficients, one coefficient for each of the N' resistivity-affecting components, and (iv) $FC^p2=\{FC^p_1, FC^p_2 \ldots FC^p_i \ldots FC^p_{N'}\}$ is a second set of empirical, temperature-independent fitting coefficients, one coefficient for each of the N' resistivity-affecting components, (C) comparing the at least one ρ,T pair resulting from step (B) with the at least one desired ρ,T pair; and (D) repeating steps (A) to (C) as necessary until at least one candidate material is selected in step (A) which gives at least one ρ,T pair in step (B) which satisfies at least one selected criterion relative to the at least one desired ρ,T pair, said at least one candidate material being the at least one material expected to have the at least one desired ρ,T pair.

In accordance with a sixth aspect, a method is disclosed for determining a relationship between temperature T and resistivity ρ for a material that (i) is a glass or glass-forming liquid and (ii) includes N' resistivity-affecting components, the method including:

(a) measuring the resistivity of a plurality of reference materials at a plurality of temperatures; and (b) using a programmed computer, fitting a function of the form $$\log_{10}\rho(T,x)=C^p_1+C^p_2 \cdot (f_1(x,FC^p1)/T) \cdot \exp([f_2(x,FC^p2)-1] \cdot [f_1(x,FC^p1)/T-1])$$

to the measured resistivities of step (a) to determine values for $FC^p1$ and $FC^p2$, where in said function:

(i) $C^p_1$ and $C^p_2$ are constants, (ii) $x=\{x_1, x_2, \ldots x_i \ldots x_{N'}\}$ are the concentrations of the N' resistivity-affecting components, (iii) $FC^p1=\{FC^p_1, FC^p_2 \ldots FC^p_i \ldots FC^p_{N'}\}$ is a first set of temperature-independent coefficients, one coefficient for each of the N' resistivity-affecting components, and (iv) $FC^p2=\{FC^p_1, FC^p_2 \ldots FC^p_i \ldots FC^p_{N'}\}$ is a second set of temperature-independent coefficients, one coefficient for each of the N' resistivity-affecting components, the function and the values for $FC^p1$ and $FC^p2$ determined in step (b) constituting the relationship between resistivity and temperature for the material.

Apparatus for practicing the above methods, specifically, programmed computers and computer readable storage media, is also disclosed.

The above summaries of the various aspects of the disclosure are only for the convenience of the reader and are not intended to and should not be interpreted as limiting the scope of the invention. More generally, it is to be understood that both the foregoing general description and the following detailed description are merely exemplary of the invention and are intended to provide an overview or framework for understanding the nature and character of the invention.

It is to be understood that the various features of the invention disclosed in this specification and in the drawings can be used in any and all combinations. In this regard, it should be noted that dependent claims have only been explicitly set forth with regard to some of the independent claims, it being understood that the similar dependent claims are applicable to the remaining independent claims, including the resistivity claims where the requisite adjustments to the claim language will be evident to the skilled reader from the present disclosure. For example, when dependent on independent claim 31 of U.S. application Ser. No. 12/896,355, dependent claim 10 will refer to resistivity-affecting components rather than viscosity-affecting components. Likewise, when dependent on independent claim 30, dependent claim 25 will refer to p being less than a first selected value rather than Similar language/symbol changes will be readily recognized by a skilled person with regard to the remainder of the independent and dependent claims.

As indicated above, the methods and apparatus for predicting viscosity disclosed herein have as their base an equation of the form:

$$\log_{10}\eta(T,x)=C_1+C_2 \cdot (f_1(x,FC1)/T) \cdot \exp([f_2(x,FC2)-1] \cdot [f_1(x,FC1)/T-1]), \quad \text{Eq. (1')}$$

where $C_1$, $C_2$, x, FC1, and FC2 are as defined above in the Summary. With regard to the viscosity-affecting components included in the vector x, it should be noted that those components can include clusters of constituents and/or constituents that might in some contexts be considered contaminants, e.g., water which would be considered a contaminant in, for example, glasses used in optical waveguide fibers. In many cases, the basic constituents of the glass will be oxides, it being understood that Eq. (1') can also be used with non-oxide glasses if desired. As to units, the composition can be expressed in any convenient units desired by the user, mole percent and weight percent being the most common choices.

Although equations of various forms have been proposed to relate viscosity to temperature and composition, the above form has been found to provide better predictions over a wider range of compositions and temperatures than those proposed in the past. For example, in the Hrma paper discussed above, Hrma applies his composition-dependent model to viscosities less than $10^{2.5}$ Pa-s only (see Hrma's FIG. 4), whereas Eq. (1') has been successfully applied to viscosities as high as $10^{11}$ Pa-s, over eight orders of magnitude higher. Also, as shown in Hrma's FIG. 5, Hrma's approach results in a large scatter between calculated and measured values of glass transition temperature, while predictions based on Eq. (1') are much more accurate over a much wider range of compositions. Furthermore, as shown in Hrma's FIG. 6, when Hrma attempts to use his model for high viscosities, the error becomes much larger, even for a small set of compositions, a problem that does not occur when an equation of the form of Eq. (1') is used. In addition, Hrma uses completely different parameters values for different sets of glasses (i.e., float glasses vs. waste glasses), while when an equation of the form of Eq. (1') is used, a common set of parameters can be employed for a wide range of glasses.

In an embodiment, Eq. (1') can be of the specific form:

$$\log_{10}\eta(T,x) = \log_{10}\eta_\infty + (12-\log_{10}\eta_\infty)\frac{T_g(x)}{T}\exp\left[\left(\frac{m(x)}{12-\log_{10}\eta_\infty}-1\right)\left(\frac{T_g(x)}{T}-1\right)\right], \quad \text{Eq. (2')}$$

where $\eta_\infty$ is the extrapolated infinite temperature viscosity (a universal constant which is independent of composition and temperature), $T_g(x)$ is the composition-dependent glass transition temperature, and m(x) is the composition-dependent fragility, which is defined as:

$$m(x) = \left.\frac{\partial \log_{10}\eta(T,x)}{\partial (T_g(x)/T)}\right|_{T=T_g(x)}. \quad \text{(Eq. 3')}$$

Comparing Eq. (2') to Eq. (1'), we see that in this embodiment:

$$C_1 = \log_{10}\eta_\infty, \text{ and}$$

$$C_2 = 12 - \log_{10}\eta_\infty (\text{or, equivalently, } C_2 = 12 - C_1).$$

As to FC1 and FC2, these are based on expansions of the glass transition temperature $T_g(x)$ and fragility $m(x)$, respectively. Beginning with the glass transition temperature expansion, this expansion can be derived from constraint theory, which makes the expansion inherently nonlinear in nature. The fragility expansion can be written in terms of a superposition of contributions to heat capacity curves, a physically realistic scenario. The net result of the choice of these expansions is that Eq. (1') can accurately cover a wide range of temperatures (i.e., a wide range of viscosities) and a wide range of compositions.

As a specific example of a constraint theory expansion of glass transition temperature, the composition dependence of $T_g$ can, for example, be given by an equation of the form:

$$f_1(x, FC1) = T_g(x) = \frac{K_R}{d - \sum_i x_i n_i \Big/ \sum_j x_j N_j}, \quad \text{Eq. (4')}$$

where the $n_i$'s are the $FC^1_i$'s, d is the dimensionality of space (normally, d=3), the $N_j$'s are the numbers of atoms in the viscosity-affecting components (e.g., N=3 for $SiO_2$, N=5 for $Al_2O_3$, and N=2 for CaO), and $K_R$ is a scaling parameter for a selected reference material R, the scaling parameter being given by:

$$K_R = T_g(x_R)\left(d - \frac{\sum_i x_{R,i} n_i}{\sum_j x_{R,j} N_j}\right), \quad \text{Eq. (5')}$$

where $T_g(x_R)$ is a glass transition temperature for the reference material obtained from at least one viscosity measurement for that material.

The summations in Eqs. (4') and (5') are over each viscosity-affecting component i and j of the material, the $x_i$'s can, for example, be expressed as mole fractions, and the $n_i$'s can, for example, be interpreted as the number of rigid constraints contributed by the various viscosity-affecting components. In Eqs. (4') and (5'), the specific values of the $n_i$'s are left as empirical fitting parameters (fitting coefficients). Hence, in the calculation of $T_g(x)$ there is one fitting parameter for each viscosity-affecting component i.

As a specific example of a fragility expansion based on a superposition of heat capacity curves, the composition dependence of m can, for example, be given by an equation of the form:

$$f_2(x, FC2) = m(x)/m_0 = \left(1 + \sum_i x_i \frac{\Delta C_{p,i}}{\Delta S_i}\right), \quad \text{Eq. (6')}$$

where the $$\frac{\Delta C_{p,i}}{\Delta S_i}\text{'s}$$

are the $FC2_i$'s, $m_0$ is $C_2$, (i.e., $m_0 = 12 \cdot \log_{10}\eta_\infty$), the $\Delta C_{p,i}$'s are changes in heat capacity at the glass transition, and the $\Delta S_i$'s are entropy losses due to ergodic breakdown at the glass transition. The constant $m_0$ can be interpreted as the fragility of a strong liquid (a universal constant). Although workers in the art have previously believed that $m_0$ is in the range of 16-17, in accordance with the present work, it has been found that $m_0$ is less than 16 and greater than or equal to 14, e.g., $m_0$ is approximately equal to 14.9.

The values of $\Delta C_{p,i}/\Delta S_i$ in Eq. (6') are left as empirical fitting parameters (fitting coefficients) for each viscosity-affecting component i. Hence, the complete viscosity model involves only two fitting parameters per viscosity-affecting component, i.e., $n_i$ and $\Delta C_{p,i}/\Delta S_i$, where the $n_i$'s are the $FC^1_i$'s and the $\Delta C_{p,i}/\Delta S_i$'s are the $FC^2_i$'s of Eq. (1').

Although the use of glass transition temperature and fragility are preferred approaches for developing expressions for $f_1(x, FC1)$ and $f_2(x, FC2)$ in Eq. (1'), other approaches can be used, if desired. For example, the strain point or the softening point of the glass, together with the slope of the viscosity curves at these temperatures can be used.

Once specific $f_1(x, FC1)$ and $f_2(x, FC2)$ expressions have been selected, values for the $FC1_i$'s and the $FC2_i$'s need to be determined. FIG. 1' sets forth in a flowchart format a suitable computer-based procedure that can be used for this purpose, it being understood that this flowchart is for illustration purposes only and that a variety of other computer-based approaches for determining the $FC^1_i$'s and $FC^2_i$'s values will be evident to skilled persons from the present disclosure and can be used if desired.

Steps 1-3 of FIG. 1' relate to the experimental portion of the process. Thus, in step 1, a reference glass composition j is chosen which is given by $\{x_i\}_j$ for i from 1 to $N_j$ for $N_j$ viscosity-affecting components, and in step 2, equilibrium viscosity values are measured at $M_j$ temperature points for the glass of step 1. Reference number 3 represents repeating steps 1 and 2 for P distinct reference glass compositions and collecting all the results into a table that relates viscosities and temperatures with compositions. Typically, the P distinct reference glass compositions will be chosen so as to span the compositional space of interest. However, this need not necessarily be the case since expressions for $\eta(T,x)$ having the form of Eq. (1') are capable of extrapolation outside of the compositional space defined by the reference glasses, i.e., the expressions are able to predict accurately the viscosity of a glass of interest as a function of temperature even if one or more of the $x_i$'s of the glass of interest is outside the range for that $x_i$ covered by the reference glasses.

Steps 4-10 relate to the determination of the fitting coefficients. In step 4, an initial set of fitting coefficients are chosen, and in step 5, those coefficients are used in the $\eta(T,x)$ equation to calculate viscosities for all the temperatures and compositions listed in the table of step 3. In step 6, an error is calculated by using, for example, the sum of squares of the deviations of log(viscosity) between calculated and measured values for all temperatures and all the compositions in the table of step 3. In step 7, this error is checked against previous errors. If this is the first time through step 7 or if the error has improved since the last time through step 7, the process branches to step 8.

In step 8, the fitting coefficients are adjusted in a direction that reduces the calculated error using one or more numerical computer algorithms known in the art, such as the Levenburg-Marquardt algorithm. Thereafter, steps 5-8 are repeated until the error is adequately small or cannot be further improved. The process then branches to step 9 where a check is made to see if the error has become "stuck" in a local minimum. For example, in this step, a new initial choice of fitting coefficients can be made and the process returned to steps 4-8 to see if a better solution is obtained. Finally, in step 10, the final choice of fitting coefficients are outputted, i.e., the fitting coefficients that give the least error in step 6 between measured viscosity values and calculated ones over all temperatures and compositions after all attempts at minimizing the error are completed. If desired, the $C_1$ and $C_2$ parameters of Eq. (1') can also be included in the error minimization process.

Once $C_1$, $C_2$, the $FC^1_i$'s, and the $FC^2_i$'s have been determined, Eq. (1') is complete and ready for use in a variety of applications. For example, as illustrated in the flowchart of FIG. 2', the $\eta(T,x)$ relationship can be used for process control.

In this figure, 101 represents a viscosity model according to the present disclosure which employs an $\eta(T,x)$ relationship having the form of Eq. (1') that has been programmed into a computer system so that calculations of viscosity for given temperatures and compositions can be made, while 102 represents a glass manufacturing process that, among other things, involves achieving a composition and obtaining given viscosities at given temperatures, where the composition and/or the temperatures can be varied by adjusting batching conditions and/or temperature (heating/cooling) controls. It should be noted that instead of containing $\eta(T,x)$, 101 can contain a lookup table stored in a computer memory of viscosity/temperature/composition information obtained using an expression for $\eta(T,x)$ having the form of Eq. (1'). In this way, the need to evaluate the $\eta(T,x)$ relationship in real time can be avoided.

In 103, one or more measurements are made to reveal the operating condition of the 102 process. The measurements can, for example, be of temperature at one or more points in the process, and/or composition, and/or viscosity of the finished glass and/or the glass at one or more intermediate stages.

In 104, a comparison is made of the measurement or measurements of step 103 against target values or ranges for temperature, composition, and/or viscosity, as appropriate. If the comparison reveals that viscosity(s), temperature(s), and composition are within acceptable ranges, control transfers to 108 which permits the process to continue to run as currently configured. However, if the 104 comparison reveals a discrepancy between the measured value(s) and the target value(s) or range(s), an input (e.g., 105, 106) is generated and fed back to process 102.

Input 105 can be, for example, the response to a case where composition is found to have shifted slightly away from its target value, and can involve re-establishing a target viscosity at a given point in the process by shifting the temperature by an amount specified by the model of 101. Input 106 can again involve the case where composition is found to have shifted slightly away from its target value, but in this case the feedback response can be to re-establish the target viscosity at a given point in the process by altering the fraction of one or more selected viscosity-affecting components of the glass, with the choice of which component(s) to vary being governed by the viscosity model of 101, as well as other practical concerns such as other non-viscosity glass properties.

Input 107 represents a more general input to process 102 which may or may not be directly linked to measurement step 103 and comparison step 104. For example, 107 can represent a viscosity adjustment that is needed to improve the overall running of the process, e.g., an adjustment necessitated by a change in the source of a raw material. Such an adjustment can be achieved either by altering temperatures and/or by altering the fraction of viscosity-affecting components in a manner consistent with the viscosity model of 101.

It should, of course, be understood that the foregoing discussion of just three possible inputs into process 102 is for convenience of presentation only, and as will be evident to persons skilled in the art, a variety of other inputs are possible depending on the specifics of the particular glass manufacturing process to which the viscosity model disclosed herein is applied.

In addition to the process control application illustrated in FIG. 2', the $\eta(T,x)$ relationship can be used to discover new glass compositions meeting some desired set of viscosity criteria (e.g., melting point below a certain temperature and/or annealing point above a certain temperature). The steps in the discovery process can, for example, involve determining a desired range of viscosity isokom temperatures and then using Eq. (1') to generate quantitative viscosity-temperature-composition data to screen potential compositions for meeting the viscosity requirements. Results of the process can, for example, be reported as both the most optimum composition and the full range of compositions satisfying the desired viscosity properties.

More generally, viscosity predictions based on Eq. (1') can be used, for example, to guide experimental composition research, to pre-screen candidate glasses so as to reduce the number of compositions that need to be melted, and/or to reduce the number of low-temperature viscosity measurements that need to be performed, this last benefit being possible because accurate extrapolations to low temperatures are possible without systematic error. As discussed above, the form of Eq. (1') is physics-based, building on concepts from rigidity theory. As such, the model can extrapolate much more effectively compared to purely empirical models. In addition, because of their basis in physics, the values of the model parameters themselves offer physical insight into the role of each viscosity-affecting component in the network, which can provide the glass scientist with insights he/she would not otherwise have had.

FIG. 3' illustrates one type of compositional research contemplated by the present disclosure. This ternary plot, calculated using the above viscosity model, shows the variation in annealing point in ° C. as a function of composition for a three-component hypothetical glass containing the oxides $SiO_2$, $Al_2O_3$, and $CaO$. The legend in this figure extends from 700° C. to 820° C. Plots of this kind can be used by glass scientists in guiding composition research to obtain optimized viscosity curves for a given application.

In addition to being highly effective in relating viscosity to temperature and composition, the form of Eq. (1') has been found to be highly effective in relating resistivity p to these variables. In this case, Eq. (1') becomes:

$$\log_{10}\rho(T,x) = C^\rho_1 + C^\rho_2 \cdot (f_1(x, FC^\rho 1)/T) \cdot \exp([f_2(x, FC^\rho 2) - 1] \cdot [f_1(x, FC^\rho 1)/T - 1]) \qquad \text{Eq. (7')}$$

where $C^\rho_1$, $C^\rho_2$, x, $FC^\rho 1$, and $FC^\rho 2$ are as defined above in the Summary.

As with viscosity, a particularly effective embodiment of Eq. (7') is one in which $f_1(x,FC^{\rho}1)$ relates to glass transition temperature and $f_2(x,FC^{\rho}2)$ relates to fragility. In this case, the resistivity version of Eq. (2') becomes:

$$\log_{10}\rho(T, x) = \log_{10}\rho_\infty +$$
$$(12 - \log_{10}\eta_\infty)\frac{T_g(x)}{T}\exp\left[\left(\frac{m(x)}{12 - \log_{10}\eta_\infty} - 1\right)\left(\frac{T_g(x)}{T} - 1\right)\right] \quad \text{Eq. (8')}$$

where $\rho_\infty$ is the extrapolated infinite temperature resistivity (e.g., $\rho_\infty = 10^{-4}$ Ω-m), and $\eta_\infty$, $T_g(x)$, and $m(x)$ are as defined above (see Eqs. (3')-(6')). Comparing Eq. (8') to Eq. (7'), we see that in this embodiment:

$$C^{\rho 1} = \log_{10}\rho_\infty, \text{ and}$$
$$C^{\rho 2} = 12 - \log_{10}\eta_\infty.$$

If desired, the $FC^1_i$'s and $FC^2_i$'s determined for the viscosity determination can be used as the $FC^{\rho 1}_i$'s and $FC^{\rho 2}_i$'s for the resistivity determination. However, in practice, it has been found that better resistivity predictions are achieved by performing a separate fit to resistivity data. FIG. 4' illustrates the types of shifts in $n_i$ values (horizontal axis) and $\Delta C_{p,i}/\Delta S_i$ values (vertical axis) that are observed. In this figure, the diamonds are the values obtained by fitting to viscosity data, while the squares are the values obtained by fitting to resistivity data. The horizontal arrow shows the direction of increasing $T_g$ while the vertical arrow shows the direction of increasing fragility.

As with viscosity, the fitting to obtain resistivity coefficients can be performed using techniques of the type illustrated in FIG. and the resulting equation for $\rho(T,x)$ can be used to identify compositions having desired resistivity properties and/or to control a production process in a manner analogous to that illustrated in FIG. 2' for $\eta(T,x)$. In particular, the resistivity predictions are of particular value in controlling the melting stage of a glass manufacturing process. As will be evident from the present disclosure, the $\eta(T,x)$ and $\rho(T,x)$ predictions can be used in combination both with regard to identifying compositions having desirable properties and/or in controlling production processes. It should be noted that although a "production process" will normally be a commercial process, it can also be an experimental process, e.g., a laboratory scale process.

The mathematical procedures described above can be readily implemented using a variety of computer equipment and a variety of programming languages or mathematical computation packages such as MATHEMATICA (Wolfram Research, Champaign, Ill.), MATLAB (MathWorks of Natick, Mass.), or the like. Customized software can also be used. Output from the procedures can be in electronic and/or hard copy form, and can be displayed in a variety of formats, including in tabular and graphical form. For example, graphs of $\eta(T,x)$ and/or $\rho(T,x)$ can be prepared using commercially available data presentation software such as MICROSOFT's EXCEL program or similar programs. Software embodiments of the procedures described herein can be stored and/or distributed in a variety of forms, e.g., on a hard drive, diskette, CD, flash drive, etc. The software can operate on various computing platforms, including personal computers, workstations, mainframes, etc.

Without intending to limit it in any manner, the invention will be further illustrated by the following examples.

Example 1'

This example illustrates the effectiveness of Eq. (1') in predicting viscosity as a function of temperature and/or composition.

In particular, FIG. 5 illustrates the effectiveness of an equation of the form of Eq. (1') (specifically, Eq. (2')) in predicting viscosity as a function of temperature for a particular glass composition. In this case, the glass composition, which is suitable for display applications, contained six viscosity-affecting components, i.e., $SiO_2$, $Al_2O_3$, MgO, CaO, SrO, and BaO.

Fitting coefficients of the type shown in FIG. 4', i.e., FC1 and FC2 vectors, were obtained for the six viscosity-affecting components using a set of reference glasses and a fitting procedure of the type described above in connection with FIG. 1'. In practice, it has been found that as the size of the family of reference glasses increases, the fitting coefficients settle down to essentially fixed values which show little or no variation as new experimental data is added to the reference collection. For this example, the family of reference glasses did not include the glass for which the predicted viscosity was calculated.

As shown in FIG. 5', the Eq. (1') model gave an excellent prediction of the viscosity curve over the entire range of temperatures, using only the composition of the glass as input. In this figure, the black curve is the extrapolation in composition space, the square data point represents the results of a fiber elongation measurement, and the diamond data points represent results of high temperature viscosity measurements.

FIG. 6' shows the effectiveness of Eq. (1') over a wide range of temperatures and compositions. In this figure, the horizontal axis represents the results of over 7,000 viscosity measurements on over 750 different compositions, while the vertical axis represents the corresponding predicted temperature values obtained using an equation of the form of Eq. (1') (specifically, Eq. (2')) and an $n_i$ and a $\Delta C_{p,i}/\Delta S_i$ fitting coefficient for each of the viscosity-affecting components contained in the particular glass whose isokom temperature ($\rho$=10 Pa-s to $10^{11}$ Pa-s) was calculated. The RMS error in isokom temperature was only 6.55 K, a truly small value for this large a population of glasses.

Example 2'

This example illustrates the effectiveness of Eq. (7') in predicting resistivity as a function of temperature and/or composition.

In particular, FIG. 7' compares predicted versus measured resistivity for over 7,500 resistivity measurements (units=ohm-meters) on over 800 compositions at a variety of temperatures. The predicted temperature values were obtained using an equation of the form of Eq. (7') (specifically, Eq. (8')) and an $n_i$ and a $\Delta C_{p,i}/\Delta S_i$ fitting coefficient for each of the resistivity-affecting components contained in the particular glass. The RMS error of the log values of FIG. 7' was 0.047. Importantly, both a fractional Stokes-Einstein model and a linear Stokes-Einstein model were found to give RMS errors of the log values more than 10 times higher for the same compositions and resistivity measurements, i.e., 0.137 and 0.134, respectively. The improved RMS error of the Eq. (7') model illustrates its effectiveness in predicting resistivity based on temperature and composition inputs.

From the foregoing, it can be seen that improved techniques for predicting the properties of glass materials, specifically, viscosity and resistivity, have been provided. A variety of modifications that do not depart from the scope and spirit of the invention will be evident to persons of ordinary skill in the art from this disclosure. The following claims are intended to cover the specific embodiments set forth herein as well as modifications, variations, and equivalents of those embodiments.

What is claimed is:

1. A method of making a glass article, comprising:
(I) melting batch materials to produce molten glass;
(II) heating or cooling the molten glass to a temperature; and
(III) forming a glass article from the molten glass;
wherein:
the batch materials comprise a plurality of viscosity-affecting components that become at least part of the glass article;
selection of batch materials or the temperature was made at least in part using computer-implemented modeling evaluating an equation of the form:

$$\log_{10}\eta(T,x)=C_1+C_2\cdot(f_1(x,FC1)/T)\cdot\exp([f_2(x,FC2)-1]\cdot[f_1(x,FC1)/T-1])$$

where T is the temperature; $\eta$ is shear viscosity of the molten glass; $C_1$ and $C_2$ are constants; $x=\{x_1, x_2, \ldots x_i \ldots x_N\}$ is a set of concentrations of viscosity-affecting components from 1 to N; $FC^1_1=\{FC^1_2, \ldots FC^1_i \ldots FC^1_N\}$ is a first set of temperature-independent coefficients, one for each of the viscosity-affecting components; and $FC2=\{FC^2_1, FC^2_2 \ldots FC^2_i \ldots FC^2_N\}$ is a second set of temperature-independent coefficients, one for each of the viscosity-affecting components.

2. The method of claim 1, further comprising (IV) processing the molten glass by float and (V) cooling the molten glass, thereby imparting a temperature profile on the glass article, and wherein the glass article is a substrate for a display.

3. The method of claim 1, further comprising (IV) submerging the glass article in a molten salt bath at an elevated temperature and (V) holding the glass article in the molten salt bath at the elevated temperature, thereby facilitating an ion-exchange process, and wherein the glass article is cover glass for a scratch-resistant touch screen for the portable electronic device.

4. The method of claim 1, wherein the viscosity-affecting components comprise $SiO_2$.

5. The method of claim 1, further comprising referencing a lookup table of viscosity, temperature, and composition information obtained using the equation.

6. A method of making a glass article, comprising:
(I) melting batch materials to produce molten glass;
(II) heating or cooling the molten glass to a temperature;
(III) forming a glass article from the molten glass; and
(IV) processing the molten glass by float;
wherein:
the batch materials comprise a plurality of viscosity-affecting components that become at least part of the glass article;
selection of batch materials or the temperature was made at least in part using computer-implemented modeling evaluating an equation of the form:

$$\log_{10}\eta(T,x)=C_1+C_2\cdot(f_1(x,FC1)/T)\cdot\exp([f_2(x,FC2)-1]\cdot[f_1(x,FC1)/T-1])$$

where T is the temperature; $\eta$ is shear viscosity of the molten glass; $C_1$ and $C_2$ are constants; $x=\{x_1, x_2, \ldots x_i \ldots x_N\}$ is a set of concentrations of viscosity-affecting components from 1 to N; $FC1=\{FC^1_1, FC^1_2 \ldots FC^1_i \ldots FC^1_N\}$ is a first set of temperature-independent coefficients, one for each of the viscosity-affecting components; and $FC2=\{FC^2_1, FC^2_2 \ldots FC^2_i \ldots FC^2_N\}$ is a second set of temperature-independent coefficients, one for each of the viscosity-affecting components.

7. The method of claim 6, further comprising (V) cooling the molten glass, thereby imparting a temperature profile on the glass article, and wherein the glass article is a substrate for a display.

8. The method of claim 6, further comprising (V) submerging the glass article in a molten salt bath at an elevated temperature and (VI) holding the glass article in the molten salt bath at the elevated temperature, thereby facilitating an ion-exchange process, and wherein the glass article is cover glass for a scratch-resistant touch screen for the portable electronic device.

9. The method of claim 6, wherein the viscosity-affecting components comprise $SiO_2$.

10. The method of claim 6, further comprising referencing a lookup table of viscosity, temperature, and composition information obtained using the equation.

11. A method of making a glass article, comprising:
(I) melting batch materials to produce molten glass;
(II) heating or cooling the molten glass to a temperature;
(III) forming a glass article from the molten glass; and
(IV) submerging the glass article in a molten salt bath at an elevated temperature;
wherein:
the batch materials comprise a plurality of viscosity-affecting components that become at least part of the glass article;
selection of batch materials or the temperature was made at least in part using computer-implemented modeling evaluating an equation of the form:

$$\log_{10}\eta(T,x)=C_1+C_2\cdot(f_1(x,FC1)/T)\cdot\exp([f_2(x,FC2)-1]\cdot[f_1(x,FC1)/T-1])$$

where T is the temperature; $\eta$ is shear viscosity of the molten glass; $C_1$ and $C_2$ are constants; $x=\{x_1, x_2, \ldots x_i \ldots x_N\}$ is a set of concentrations of viscosity-affecting components from 1 to N; $FC1=\{FC^1_1, FC^1_2 \ldots FC^1_i \ldots FC^1_N\}$ is a first set of temperature-independent coefficients, one for each of the viscosity-affecting components; and $FC2=\{FC^2_1, FC^2_2 \ldots FC^2_i \ldots FC^2_N\}$ is a second set of temperature-independent coefficients, one for each of the viscosity-affecting components.

12. The method of claim 11, further comprising (V) cooling the molten glass, thereby imparting a temperature profile on the glass article.

13. The method of claim 11, further comprising and (V) holding the glass article in the molten salt bath at the elevated temperature, thereby facilitating an ion-exchange process, and wherein the glass article is cover glass for a scratch-resistant touch screen for the portable electronic device.

14. The method of claim 11, wherein the viscosity-affecting components comprise $SiO_2$.

15. The method of claim 11, further comprising referencing a lookup table of viscosity, temperature, and composition information obtained using the equation.

* * * * *

UNITED STATES PATENT AND TRADEMARK OFFICE
CERTIFICATE OF CORRECTION

PATENT NO. : 11,023,630 B1  
APPLICATION NO. : 17/090185  
DATED : June 1, 2021  
INVENTOR(S) : Douglas Clippinger Allan et al.

Page 1 of 1

It is certified that error appears in the above-identified patent and that said Letters Patent is hereby corrected as shown below:

On the Title Page

In Column 2, item (56), Other Publications, Line 16, delete "at" and insert -- et --, therefor.

In Column 2, item (56), Other Publications, Line 22, delete "(CRC" and insert -- CRC --, therefor.

On page 2, in Column 2, item (56), Other Publications, Line 26, delete "Comperssive" and insert -- Compressive --, therefor.

On page 2, in Column 2, item (56), Other Publications, Line 44, delete "Behavoir" and insert -- Behavior --, therefor.

In the Claims

In Column 29, Line 30, Claim 1, delete "$FC^1_1=\{FC^1_2, \ldots FC^1_i \ldots FC^1_N\}$" and insert -- FC1 = $\{FC^1_1, FC^1_2 \ldots FC^1_i \ldots FC^1_N\}$ --, therefor.

Signed and Sealed this  
Eighth Day of March, 2022

Drew Hirshfeld  
*Performing the Functions and Duties of the*  
*Under Secretary of Commerce for Intellectual Property and*  
*Director of the United States Patent and Trademark Office*